US012437933B2

(12) United States Patent
Zhang et al.

(10) Patent No.: US 12,437,933 B2
(45) Date of Patent: Oct. 7, 2025

(54) CONTROLLED HEATING RATE BAKING PROTOCOL FOR THE SYNTHESIS OF BISMUTH VANADATE THIN FILMS

(71) Applicant: City University of Hong Kong, Kowloon (HK)

(72) Inventors: Ruiqin Zhang, Kowloon (HK); Rafiqat Ui Rasool, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 18/176,786

(22) Filed: Mar. 1, 2023

(65) Prior Publication Data

US 2023/0282424 A1    Sep. 7, 2023

Related U.S. Application Data

(60) Provisional application No. 63/315,575, filed on Mar. 2, 2022.

(51) Int. Cl.
*H01G 9/00* (2006.01)
*H01G 9/20* (2006.01)
*C23C 18/12* (2006.01)

(52) U.S. Cl.
CPC ......... *H01G 9/0029* (2013.01); *H01G 9/2004* (2013.01); *C23C 18/1254* (2013.01)

(58) Field of Classification Search
CPC . H01G 9/0029; H01G 9/2004; C23C 18/1254
USPC .................................................. 427/74, 80
See application file for complete search history.

(56) References Cited

U.S. PATENT DOCUMENTS

| 7,964,481 B2 * | 6/2011 | Mitzi ............... H01L 21/02601 438/500 |
| 8,940,579 B2 * | 1/2015 | Facchetti .............. C23C 18/125 438/149 |
| 10,032,923 B2 * | 7/2018 | Moon ................. C23C 18/1275 |
| 11,505,870 B2 * | 11/2022 | Khan ........................ C25B 1/55 |
| 12,084,580 B2 * | 9/2024 | Irwin ...................... C03C 17/25 |
| 2003/0121543 A1 * | 7/2003 | Gratzel ................... H01M 4/64 429/111 |
| 2008/0257201 A1 * | 10/2008 | Harris ............... H01L 21/02601 438/57 |

(Continued)

FOREIGN PATENT DOCUMENTS

CN          104549217 A  *  4/2015

OTHER PUBLICATIONS

Vignesh et al. Temperature induced thermochromism of m-BiVO4 thin films prepared by sol-gel spin coating technique—Materials Letters, 285 (2021) (Year: 2021).*

(Continued)

*Primary Examiner* — Brian K Talbot
(74) *Attorney, Agent, or Firm* — Renner, Kenner, Greive, Bobak, Taylor & Weber

(57) ABSTRACT

A method for fabricating a film on a substrate and a method for controlling the heating rate of a plurality of nanoparticles to transform the plurality of nanoparticles into a plurality of nanorods and nano-cone structures includes the steps of providing a sol precursor, providing a substrate, depositing the sol precursor onto the substrate via a sol-gel technique, annealing the sol precursor under ambient pressure at a controlled heating rate, and cooling down the sol precursor to form a film.

5 Claims, 13 Drawing Sheets

(56) References Cited

U.S. PATENT DOCUMENTS

| | | | |
|---|---|---|---|
| 2011/0003085 A1* | 1/2011 | Hugener-Campbell | ....................... C01G 15/00 427/427 |
| 2011/0198530 A1* | 8/2011 | Roy | ..................... H01M 4/9033 252/62.2 |
| 2013/0217840 A1* | 8/2013 | McCleskey | ........ C08G 73/0206 525/540 |
| 2014/0000697 A1* | 1/2014 | Wang | ..................... B01J 35/004 204/291 |
| 2014/0294721 A1* | 10/2014 | Feng | ........................ C01G 9/02 423/633 |
| 2015/0361566 A1* | 12/2015 | Choi | ....................... C01G 31/00 423/594.7 |
| 2017/0368545 A1* | 12/2017 | Berlinguette | ......... C25B 11/073 |
| 2019/0134609 A1* | 5/2019 | Yamauchi | ................. B01J 35/33 |
| 2021/0108318 A1* | 4/2021 | Jang | ..................... C25B 11/087 |
| 2023/0119366 A1* | 4/2023 | Jiang | ..................... C02F 3/2806 210/631 |
| 2023/0287586 A1* | 9/2023 | Qurashi | .............. C01B 21/0821 204/291 |

OTHER PUBLICATIONS

Spin Coated Bismuth Vanadate Thin Film as an alternative Electron Transport Layer for Light Emitting Diode Application, Solly et al. Physical Stats Solidi, 2021 vol. 18, pp. 1-10 (Year: 2021).*

Varadhan, P., et al., An efficient and stable photoelectrochemical system with 9% solar-to-hydrogen conversion efficiency via InGaP/GaAs double junction. Nature communications, 2019. 10(1): p. 1-9.

Wang, H., et al., Highly active deficient ternary sulfide photoanode for photoelectrochemical water splitting. Nature communications, 2020. 11(1): p. 1-11.

Martin, D.J., et al., Visible light-driven pure water splitting by a nature-inspired organic semiconductor-based system. Journal of the American Chemical Society, 2014. 136(36): p. 12568-12571.

Landman, A., et al., Photoelectrochemical water splitting in separate oxygen and hydrogen cells. Nature materials, 2017. 16(6): p. 646-651.

Walter, M.G., et al., Solar water splitting cells. Chemical reviews, 2010. 110(11): p. 6446-6473.

Bard, A.J. and M.A. Fox, Artificial photosynthesis: solar splitting of water to hydrogen and oxygen. Accounts of Chemical Research, 1995. 28(3): p. 141-145.

Fujishima, A. and K. Honda, Electrochemical photolysis of water at a semiconductor electrode. nature, 1972. 238 (5358): p. 37-38.

Bard, A.J., Photoelectrochemistry and heterogeneous photo-catalysis at semiconductors. Journal of Photochemistry, 1979. 10(1): p. 59-75.

Serpone, N. and A. Emeline, Semiconductor Photocatalysis 毁 Past, Present, and Future Outlook. 2012, ACS Publications.

Jian, J., et al., Recent advances in rational engineering of multinary semiconductors for photoelectrochemical hydrogen generation. Nano Energy, 2018. 51: p. 457-480.

Hwang, S., et al., Highly efficient and durable III-V semiconductor-catalyst photocathodes via a transparent protection ayer. Sustainable Energy & Fuels, 2020. 4(3): p. 1437-1442.

Nozik, A., et al., Dependence of hot carrier luminescence on barrier thickness in GaAs/AlGaAs superlattices and multiple quantum wells. Solid state communications, 1990. 75(4): p. 297-301.

Ramprakash, Y., D. Bose, and S. Basu, Transient response in n-InP PEC cells and effect of surface modification. Surface science, 1984. 145(1): p. 175-184.

Ahn, K.-S., et al., ZnO nanocoral structures for photoelectrochemical cells. Applied physics letters, 2008. 93(16): p. 163117.

Mansur, H.S., et al., Photoelectrochemical properties of 'Q-state' CdS particles in arachidic acid Langmuir-Blodgett films. Journal of the Chemical Society, Faraday Transactions, 1995. 91(4): p. 665-672.

Zhang, J., et al., High-performance CdS—ZnS core-shell nanorod array photoelectrode for photoelectrochemical hydrogen generation. Journal of Materials Chemistry A, 2015. 3(2): p. 535-541.

Oh, J., et al., Nanoporous black silicon photocathode for H 2 production by photoelectrochemical water splitting. Energy & Environmental Science, 2011. 4(5): p. 1690-1694.

Jia, J., et al., Solar water splitting by photovoltaic-electrolysis with a solar-to-hydrogen efficiency over 30%. Nature communications, 2016. 7(1): p. 1-6.

Guo, P., et al., Surface & grain boundary co-passivation by fluorocarbon based bifunctional molecules for perovskite solar cells with efficiency over 21%. Journal of materials chemistry A, 2019. 7(6): p. 2497-2506.

Kim, J.H., et al., Hetero-type dual photoanodes for unbiased solar water splitting with extended light harvesting. Nature communications, 2016. 7(1): p. 1-9.

Shi, X., et al., Unassisted photoelectrochemical water splitting exceeding 7% solar-to-hydrogen conversion efficiency using photon recycling. Nature communications, 2016. 7(1): p. 1-6.

Wang, H., et al., Size-related native defect engineering in high intensity ultrasonication of nanoparticles for photoelectrochemical water splitting. Energy & Environmental Science, 2013. 6(3): p. 799-804.

Wang, F., et al., Gradient self-doped CuBi2O4 with highly improved charge separation efficiency. Journal of the American Chemical Society, 2017. 139(42): p. 15094-15103.

Walsh, A., et al., Band edge electronic structure of BiVO4: elucidating the role of the Bi s and V d orbitals. Chemistry of Materials, 2009. 21(3): p. 547-551.

Jian, J., et al., Embedding laser generated nanocrystals in BiVO 4 photoanode for efficient photoelectrochemical water splitting. Nature communications, 2019. 10(1): p. 1-9.

Abdi, F.F., et al., The origin of slow carrier transport in BiVO4 thin film photoanodes: a time-resolved microwave conductivity study. The Journal of Physical Chemistry Letters, 2013. 4(16): p. 2752-2757.

Bhattacharya, A., K. Mallick, and A. Hartridge, Phase transition in BiVO4. Materials Letters, 1997. 30(1): p. 7-13.

Zhao, Y., et al., Surfactant-free synthesis of hyperbranched monoclinic bismuth vanadate and its applications in photocatalysis, gas sensing, and lithium-ion batteries. Chemistry-A European Journal, 2008. 14(5): p. 1601-1606.

Cooper, J.K., et al., Indirect bandgap and optical properties of monoclinic bismuth vanadate. The Journal of Physical Chemistry C, 2015. 119(6): p. 2969-2974.

Ye, F., et al., Constructing BiVO4—Au@ CdS photocatalyst with energic charge-carrier-separation capacity derived from facet induction and Z-scheme bridge for degradation of organic pollutants. Applied Catalysis B: Environmental, 2018. 227: p. 258-265.

Han, H.S., et al., Boosting the solar water oxidation performance of a BiVO4 photoanode by crystallographic orientation control. Energy & Environmental Science, 2018. 11(5): p. 1299-1306.

Abdi, F.F., et al., Efficient solar water splitting by enhanced charge separation in a bismuth vanadate-silicon tandem photoelectrode. Nature communications, 2013. 4(1): p. 1-7.

Parmar, K.P.S., et al., Photocatalytic and photoelectrochemical water oxidation over metal-doped monoclinic BiVO4 photoanodes. ChemSusChem, 2012. 5(10): p. 1926-1934.

Yang, J.-S. and J.-J. Wu, Low-potential driven fully-depleted BiVO4/ZnO heterojunction nanodendrite array photoanodes for photoelectrochemical water splitting. Nano Energy, 2017. 32: p. 232-240.

Zhou, L., et al., High light absorption and charge separation efficiency at low applied voltage from Sb-doped SnO2/BiVO4 core/shell nanorod-array photoanodes. Nano letters, 2016. 16(6): p. 3463-3474.

Zhang, L., L.O. Herrmann, and J.J. Baumberg, Size dependent plasmonic effect on BiVO 4 photoanodes for solar water splitting. Scientific reports, 2015. 5(1): p. 1-12.

Yang, W., et al., plasmonic Pd nanoparticle-and plasmonic pd nanorod-decorated BiVO 4 electrodes with enhanced photoelectrochemical water splitting efficiency across visible-NIR region. Nanoscale research letters, 2016. 11(1): p. 1-8.

(56) References Cited

OTHER PUBLICATIONS

Wei, Y., et al., Spontaneous photoelectric field-enhancement effect prompts the low cost hierarchical growth of highly ordered heteronanostructures for solar water splitting. Nano Research, 2016. 9(6): p. 1561-1569.
Nyarige, J.S., T.P. Kruger, and M. Diale, Influence of precursor concentration and deposition temperature on the photoactivity of hematite electrodes for water splitting. Materials Today Communications, 2020. 25: p. 101459.
Baqiah, H., et al., Effects of precursor concentration on the microstructural, optical and photoelectrochemical properties of $Bi_2O_3$ films synthesized by sol-gel method. Optik, 2020. 206: p. 164303.
Zhang, S., et al., Enhanced piezoelectric-effect-assisted photoelectrochemical performance in ZnO modified with dual cocatalysts. Applied Catalysis B: Environmental, 2020. 262: p. 118279.
Masoumi, Z., M. Tayebi, and B.-K. Lee, Ultrasonication-assisted liquid-phase exfoliation enhances photoelectrochemical performance in +-Fe2O3/MoS2 photoanode. Ultrasonics sonochemistry, 2021 72: p. 105403.
Wickman, B., et al., Iron oxide films prepared by rapid thermal processing for solar energy conversion. Scientific reports, 2017. 7(1): p. 1-9.
Patel, M., et al., Photocurrent enhancement by a rapid thermal treatment of nanodisk-shaped SnS photocathodes. The journal of physical chemistry letters, 2017. 8(24): p. 6099-6105.
Das, V.D., J. Sathyanarayanan, and L. Damodare, Effect of annealing and surface treatment on the efficiency of photoelectrochemical (PEC) solar cells with vacuum-deposited n-InSe thin film electrode. Surface and Coatings Technology, 1997. 94: p. 669-671.
Phuan, Y.W., et al., Effects of annealing temperature on the physicochemical, optical and photoelectrochemical properties of nanostructured hematite thin films prepared via electrodeposition method. Materials Research Bulletin, 2015. 69: p. 71-77.
Tan, H.L., R. Amal, and Y.H. Ng, Exploring the different roles of particle size in photoelectrochemical and photocatalytic water oxidation on $BiVO_4$. ACS applied materials & interfaces, 2016. 8(42): p. 28607-28614.
Liu, J., et al., Investigation of porosity and heterojunction effects of a mesoporous hematite electrode on photoelectrochemical water splitting. Physical Chemistry Chemical Physics, 2013. 15(24): p. 9775-9782.
Sousa, M., et al., Effect of rapid thermal processing conditions on the properties of $Cu_2ZnSnS_4$ thin films and solar cell performance. Solar energy materials and solar cells, 2014. 126: p. 101-106.
Cavaleiro, A., et al., The effect of heating rate on the phase transformation of Ni/Ti multilayer thin films. Vacuum, 2017. 139: p. 23-25.
Choi, Y., M. Jung, and Y.-K. Lee, Effect of heating rate on the activation energy for crystallization of amorphous $Ge_2Sb_2Te_5$ thin film. Electrochemical and Solid State Letters, 2009. 12(7): p. F17.
Zhang, Q., S. Jiang, and Y. Li, Structural Characteristics of (Ba, Sr) $TiO_3$ Thin Films by Rapid Thermal Annealing. Surface Review and Letters, 2007. 14(01): p. 141-145.
Shen, M., et al., A concise model for evaluating water electrolysis. International Journal of Hydrogen Energy, 2011. 36 (22): p. 14335-14341.
Ding, K., et al., Density functional theory study on the electronic and optical properties of three crystalline phases of BiVO 4. Theoretical Chemistry Accounts, 2013. 132(5): p. 1-7.
Holder, C.F. and R.E. Schaak, Tutorial on powder X-ray diffraction for characterizing nanoscale materials. 2019, ACS Publications.
Zhang, K., et al., Black phosphorene as a hole extraction layer boosting solar water splitting of oxygen evolution catalysts. Nature communications, 2019. 10(1): p. 1-10.
Luo, W., et al., Solar hydrogen generation from seawater with a modified $BiVO_4$ photoanode. Energy & Environmental Science, 2011. 4(10): p. 4046-4051.
Zhang, L., D. Chen, and X. Jiao, Monoclinic structured $BiVO_4$ nanosheets: hydrothermal preparation, formation mechanism, and coloristic and photocatalytic properties. The Journal of Physical Chemistry B, 2006. 110(6): p. 2668-2673.
Samsudin, M.F.R., et al., Tailoring the morphological structure of $BiVO_4$ photocatalyst for enhanced photoelectrochemical solar hydrogen production from natural lake water. Applied Surface Science, 2020. 504: p. 144417.
Huang, M., et al., Low-dimensional Mo: BiVO 4 photoanodes for enhanced photoelectrochemical activity. Journal of Materials Chemistry A, 2018. 6(8): p. 3602-3609.
Zhao, Z., et al., Effect of sulfur doping on the photocatalytic performance of $BiVO_4$ under visible light illumination. Chinese Journal of Catalysis, 2013. 34(8): p. 1617-1626.
Li, F., et al., Synergistically enhanced photocatalytic reduction of CO 2 on N—Fe codoped BiVO 4 under visible light Irradiation. Physical Chemistry Chemical Physics, 2017. 19(32): p. 21862-21868.
Tan, G., et al., Microwave hydrothermal synthesis of N-doped $BiVO_4$ nanoplates with exposed (040) facets and enhanced visible-light photocatalytic properties. Ceramics International, 2014. 40(7): p. 9541-9547.
Wang, M., et al., Effective visible light-active nitrogen and samarium co-doped $BiVO_4$ for the degradation of organic pollutants. Journal of Alloys and Compounds, 2015. 648: p. 1109-1115.
Zhao, Z., et al., Enhanced visible-light photocatalytic activities of porous olive-shaped sulfur-doped $BiVO_4$-supported cobalt oxides. Solid state sciences, 2013. 18: p. 98-104.
Chen, L., et al., Enhanced photocatalytic activity of hierarchically structured $BiVO_4$ oriented along {040} facets with different morphologies. Materials Letters, 2015. 147: p. 1-3.
Yu, J. and A. Kudo, Hydrothermal synthesis of nanofibrous bismuth vanadate. Chemistry letters, 2005. 34(6): p. 850-851.
Wu, J.-M., et al., Multi-layer monoclinic $BiVO_4$ with oxygen vacancies and V4+ species for highly efficient visible-light photoelectrochemical applications. Applied Catalysis B: Environmental, 2018. 221: p. 187-195.
Hankin, A., et al., Flat band potential determination: avoiding the pitfalls. Journal of Materials Chemistry A, 2019. 7(45): p. 26162-26176.
Bicer, Y. and I. Dincer, Electrochemical impedance spectroscopic assessment and analysis of a newly developed photoelectrochemical cell. Chemical Engineering and Processing: Process Intensification, 2017. 117: p. 141-153.

\* cited by examiner

CONTROLLED HEATING RATE BAKING PROTOCOL FOR THE SYNTHESIS OF BISMUTH VANADATE THIN FILMS

FIELD OF THE INVENTION

This invention relates to a method of controlling the deposition of metal oxide semiconductor thin films. Particularly, this invention relates to a method of controlling the deposition of bismuth vanadate ($BiVO_4$) films on a substrate.

BACKGROUND OF THE INVENTION

Photoelectrochemical (PEC) cells are a promising alternative to natural photosystem which employ a photoactive semiconductor as an electrode and sunlight as input energy, to produce chemical energy by splitting water into hydrogen and oxygen. This process stores solar energy in a very basic and the simplest chemical bond known as H—H bond. Honda and Fujishima are the pioneers in artificial photosystem discovery as they revealed the photoelectrochemical properties of nanosized Titania ($TiO_2$) in 1967 and published their findings in 1972 (Fujishima, A. and K. Honda, Electrochemical photolysis of water at a semiconductor electrode. nature, 1972. 238(5358): pp. 37-38). The process is known as "Honda-Fujishima effect" named after its discoverers. To date, a variety of semiconductors have been successfully employed as electrodes for the electrolysis of water to produce hydrogen and oxygen. III-V semiconductors (such as $GaInP_2$, AlGaAs, and InP) and II-VI semiconductors (such as ZnO, CdS, and ZnS) have shown good photoactive responses with a solar to hydrogen (STH) conversion efficiency of about 20%. However, these materials face the limitation of severe aqueous electrolyte instability as well as a high production cost that results in an uneconomical yield at a commercial level.

In contrast, metal oxides are comparatively durable as they can typically withstand aqueous solutions and are also relatively cheaper than III-V and II-VI semiconductors. However, fast charge carrier recombination and poor charge carrier mobility are focal obstacles and hence the reported STH conversion efficiency of these materials is less than 8%. These factors result in low output performance that lies far below their theoretical current density values.

The monoclinic scheelite type polymorph of bismuth vanadate ($BiVO_4$) is a promising ternary metal oxide photoelectrode material and has recently grabbed interest due to its favorable band structure ($E_g$~2.3-2.6 eV), a suitable band edge position ($C_B$ at ~0V vs. RHE), and intrinsic electrical properties. Bismuth vanadate has three polymorphs (FIG. 1D, top to bottom), including Dreyerite (tetragonal zircon), Clinobisvanite (monoclinic scheelite), and Pucherite (orthorhombic). Among these, the crystallographic and electronic properties of the monoclinic scheelite $BiVO_4$ show a good correlation with photocatalytic activity. However, $BiVO_4$ undergoes acute charge carrier recombination under illumination owing to the low mobility of the charge carriers (~0.043 $cm^2 V^{-1} s^{-1}$). The literature shows that the experimentally achieved highest photocurrent density of pristine $BiVO_4$ is around 3.6 $mA\ cm^{-2}$, by using the laser ablation method for preferential growth of $BiVO_4$ in [001] facets which is the crystallographic plane for the preferential growth of bismuth vanadate. However, this work cannot yield commercial-scale products due to a decrease in ablation efficiency with time, requirement of a great amount of energy, and high production cost of a laser system. Hence developing the facile protocols to design an efficient $BiVO_4$ photoelectrode by addressing its intrinsic limitations of poor charge carrier transport has thus been a great confrontation.

Different approaches have been developed for addressing the poor charge transport in $BiVO_4$ photoanodes including doping, heterojunction formation, plasmonic, and nanostructuring. The role of experimental parameters on the quality and performance of the product can never be ignored. Changing the precursors' concentration, ultrasonication treatment, optimizing the thermal treatment, and annealing conditions have influential effects on tailoring the morphology and final output of the materials for photo-driven applications.

The previous methods for depositing metal oxide thin films adopted slow heating rates for the annealing process, thereby yielding the product with compromised stability in the output performance for various applications.

Accordingly, the need remains for a fast and facile method with economic and environmentally friendly prerequisites to produce metal oxide thin films that are stable in aqueous electrolyte and prolonged mechanical cycling. This method successfully introduces the desirable physiochemical defects (e.g., porosity and oxygen vacancies) to the material. The charge carrier mobility is significantly increased whereas the carrier recombination is abated via single step spin coating followed by controlled heating rate annealing.

SUMMARY OF THE INVENTION

An embodiment of the present invention relates to a method for fabricating a film on a substrate including the steps of providing a sol precursor, providing a substrate, depositing the sol precursor onto the substrate via a sol-gel technique, annealing the sol precursor under ambient pressure at a controlled heating rate, and cooling down the sol precursor to form a film.

An embodiment of the present invention also relates to a method for controlling the heating rate of a plurality of nanoparticles to transform the plurality of nanoparticles into a plurality of nanorods and nano-cone structures including the steps of providing a sol precursor containing a plurality of nanoparticles, providing a substrate, depositing the sol precursor onto the substrate via a sol-gel technique to form a plurality of densely stacked nanoparticles, annealing the sol precursor at a controlled heating rate, wherein the controlled heating rate is from about 10° C./min to about 70° C./min, preferably about 60° C./min, and cooling down the precursor to form a plurality of nanorods and nano-cone structures.

Without intending to be limited by theory it is believed that the present invention may provide a method for depositing the large-sized uniform $BiVO_4$ films on desired substrate through rapid annealing process without the use of any complex parameters to be controlled (such as particular gaseous environment, vacuum system, and generation of quality laser ablation) with tunable surface morphology, roughness, size, and thickness, which can also be extended to synthesize other semiconductor thin films. The method is noncomplex while both the requisite materials and the final product are non-toxic. The invention straightforwardly boosts the charge generation and mobility of the material and suppressed the charge recombination by introducing favorable defects.

This fast and facile method with economical and environmentally friendly prerequisites can introduce the required physical and chemical defects (such as surface roughness, porosity and oxygen vacancies generation) that can design products for various applications via a controlled heating rate annealing process. As the product obtained using this method turned out to be stable in aqueous electrolyte and prolonged mechanical cycling, it is expected that this invention will lead to advanced applications of the metal oxide thin films in wearable devices, self-sensors, PEC cells, light-emitting devices (LEDs), triboelectric nanogenerators, and photocatalysis.

Figure 1A:
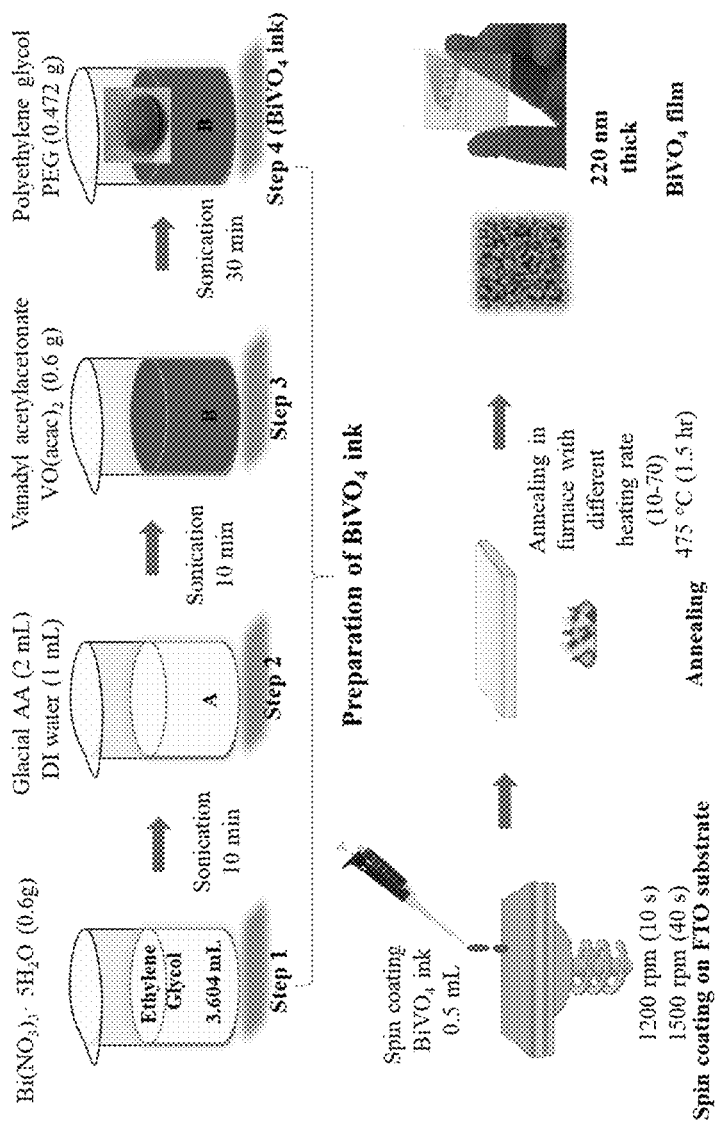
FIG. 1A shows a schematic illustration of $BiVO_4$ thin films deposition protocol by a spin coating method.
Figure 1A:
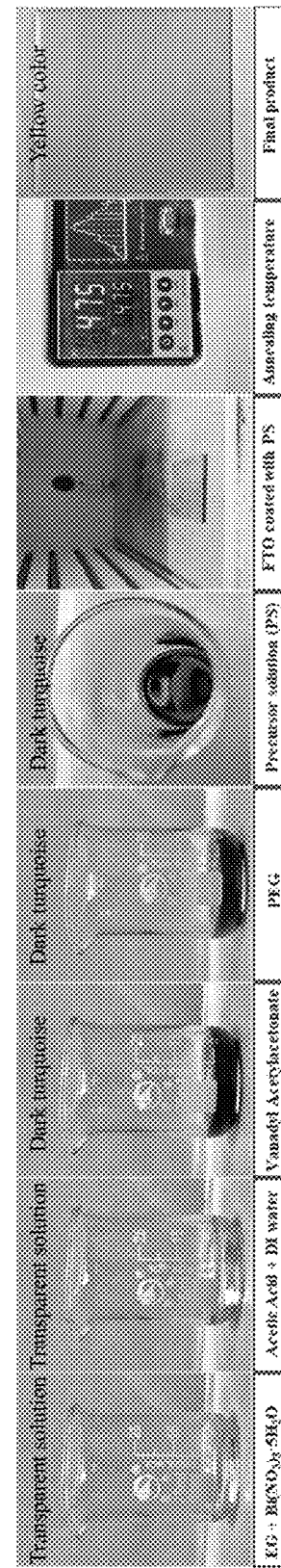

The figures herein are for illustrative purposes only and are not necessarily drawn to scale.

DETAILED DESCRIPTION OF PREFERRED EMBODIMENTS

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise. It is understood that unless otherwise specifically noted, the materials compounds, chemicals, etc. described herein are typically commodity items and/or industry-standard items available from a variety of suppliers worldwide.

An embodiment of the present invention relates to a method for fabricating a film on a substrate including the steps of providing a sol precursor, providing a substrate, depositing the sol precursor onto the substrate via a sol-gel technique, annealing the sol precursor under ambient pressure at a controlled heating rate, and cooling down the sol precursor to form a film.

Without intending to be limited by theory it is believed that the rapid annealing rates appeared to be influential towards the nucleation process of materials which is verily a facile method to tune the physiochemical properties of materials.

In an embodiment herein, the sol precursor includes a metal oxide. The metal oxide is selected from the group consisting essentially of bismuth vanadate, zinc oxide, iron oxide, and a combination thereof.

In an embodiment herein, the substrate includes an adhesive base. The adhesive base is selected from the group consisting essentially of FTO glass, ITO glass, plain glass, and a combination thereof.

In an embodiment herein, the sol-gel technique includes a coating step. The coating step is selected from the group consisting essentially of spin coating, dip coating, and a combination thereof.

In an embodiment herein, the annealing step occurs in a muffle furnace at a temperature of from about 400° C. to about 550° C.

In an embodiment herein, the annealing step takes from about 0.5 hours to about 5 hours.

In an embodiment herein, the controlled heating rate is from about 10° C./min to about 70° C./min.

In an embodiment herein, a photoelectrode comprising a film and a substrate is fabricated according to the method for fabricating a film on a substrate. The method includes the steps of providing a sol precursor, providing a substrate, depositing the sol precursor onto the substrate via a sol-gel technique, annealing the sol precursor under ambient pressure at a controlled heating rate, and cooling down the sol precursor to form a film.

In an embodiment herein, a photoelectrode includes a nanostructure. The nanostructure is selected from the group consisting essentially of a nanorod, a nano-cone structure, and a combination thereof.

This invention is a simple, inexpensive, and commercial-scale product yielding a technique to tune the intrinsic properties of pristine $BiVO_4$ for better charge generation and mobility. Hence the optimization of experimental parameters (such as thermal treatment control) during deposition of $BiVO_4$ thin films is a substantial approach because the electrical properties of the thin films depend on their structural traits, such as particle size, grain boundaries, and porosity. Literature proves that changing the rising rate of heating temperature for annealing the material can tailor its chemical properties and the phase. Practically, the effective energy EA of nucleation and crystallization can be tuned by varying the heating rate (rise of ° C./min) during the annealing process of the materials. The effect of annealing temperature, heating rate and duration time on crystallization are studied through X-ray diffraction and atomic force microscopy. The result shows that the crystallinity and grain size are strongly dependent on the temperature, heating rate, and duration time. A higher heating rate leads to a smaller grain size. In a high heating rate, the grain size shows different dependence of temperature from that of low heating rate. No research on substantial heat-treatment studies of BiVO$_4$ thin films has been found. Varying the annealing conditions and the heating temperature is the initial idea which ends up providing the basis for comparing the heating rate at 10° C., 20° C., 30° C., 40° C., 50° C., 60° C., and 70° C. rises per minute (coded them as BV-10° C., BV-20° C., BV-30° C., BV-40° C., BV-50° C., BV-60° C., and BV-70° C. with reference to their rate of rising temperature) to reach 475° C. for baking the film after spin coating the FTO glass with precursor solution.

The sample that outperformed the rest is BV-60° C. with a heating rate of 60° C. rise per minute. In this study, inventors successfully designed this novel and easy protocol that could pronounce a 5-fold increase in photocurrent density up to 3.17 mA cm$^{-2}$ at 1.23 V vs RHE (0.6 mA cm$^{-2}$ for BV-10° C.), that is the highest value of pristine bismuth vanadate photocurrent density reported to date under any condition. The XPS, UV-vis, and AFM analysis confirms that tuning the baking parameters of thin films alters the inter-atomic bonding, lowers the bandgap energy and adjusts the morphology of the film in such a way to universally enhance the photoactivity of BiVO$_4$, thus providing an easy and effective alternative for fixing the charge transport limitations in a ternary metal oxide-based BiVO$_4$ photoelectrodes.

The BiVO$_4$ films are deposited by the single-step spin coating method followed by the annealing in normal air condition at high temperature with varying the heating rate of the furnace for different samples. XRD examination reveals that all the samples have a monoclinic scheelite structure. The porosity in the morphology of BV-60° C. increases the physical surface defects are believed to create charge traps for suppressing charge carrier's recombination. Moreover, this sample turns out to be rich in O$_{V_s}$ and V$^{4+}$ ions in its lattice sites, which promotes photon absorption, charge generation, and charge mobility. These morphological and electronic defects are believed to reduce the bandgap energy from 2.55 eV to 2.33 eV and achieves the highest photocurrent density ~3.17 mAcm$^{-2}$ reported to date for the pristine BiVO$_4$. The 4.5-hour stability test reveals that tuning the thermal conditions during BiVO$_4$ thin film deposition can produce an efficiently photoactive material that can withstand the aqueous electrolyte for a long duration, hence can prevent short circuiting.

In an embodiment herein, the sol precursor includes a metal oxide. The metal oxide is selected from the group consisting essentially of bismuth vanadate, zinc oxide, iron oxide, and a combination thereof. Here, the material of interest is from metal oxide semiconductors as they are earth abundant and have a relatively large bandgap that results in high photovoltage for various applications. Metal oxide semiconductors including ZnO, SnO$_2$ and Fe$_2$O$_3$, perovskites (ABX3), and organic semiconductors including pentacene and Alq$_3$ (Tris(8-hydroxyquinolinato)aluminum) can be deposited by this method to achieve the favorable intrinsic and extrinsic properties.

In an embodiment herein, the substrate includes an adhesive base. The adhesive base is selected from the group consisting essentially of FTO glass, ITO glass, plain glass, and a combination thereof. Alternatively, the substrate can be a metal substrate such as copper, and metal alloys on demand; or the substrate can be carbon paper and graphitic carbon. The temperature endurance limits, thermal stability, resistivity and visibility of these substrates are different from each other and can be opted as per specific needs.

In an embodiment herein, the sol-gel technique includes a coating step. The coating step is selected from the group consisting essentially of spin coating, dip coating, and a combination thereof. This is a simplistic method to control the thickness of thin film and it does not need too many parameters that need to be controlled. It produces a uniform thin film with a low-cost production and fast porting time. The film progressively becomes more uniform as it thins.

In an embodiment herein, the annealing step occurs in a muffle furnace at a temperature of from about 400° C. to about 550° C. The final annealing temperature varies for different materials and, for BiVO$_4$, this temperature varies from about 400° C. to about 550° C. The flexibility of this method is that the temperature window can be changed according to the material of interest from aforementioned group of materials. The possible temperature window can be from about 200° C. to about 800° C.; or from about 300° C. to about 600° C.; or from about 400° C. to about 550° C.; or from about 450° C. to about 500° C.

In an embodiment herein, the annealing step takes from about 15 minutes to about 10 hours; or from about 30 minutes to about 5 hours; or from about 1 hour to about 2 hours.

In an embodiment herein, the controlled heating rate is from about 1° C./min to about 100° C./min; or from about 5° C./min to about 80° C./min; or from about 10° C./min to about 75° C./min; or from about 30° C./min to about 70° C./min. These features are optimized by performing a series of reactions by setting different combinations of parameters. These optimized features provide a favorable nucleation time which hereby results in an output product with better photoactivity and mechanical strength.

In an embodiment herein, a photoelectrode comprising a film and a substrate is fabricated according to the method for fabricating a film on a substrate. The method includes the steps of providing a sol precursor, providing a substrate, depositing the sol precursor onto the substrate via a sol-gel technique, annealing the sol precursor under ambient pressure at a controlled heating rate, and cooling down the sol precursor to form a film. The method allows flexibility in choosing the precursor and substrate for variety of applications with the films being doped with a selected dopant(s) for a specific purpose and of a desired shape.

In an embodiment herein, a photoelectrode includes a nanostructure. In an embodiment herein the nanostructure contains a nanorod, a nano-cone structure, and a combination thereof. The vertically oriented nano-cones array would provide a greater contact area between the electrolyte and the photoanode, as well as a larger particle size. Since the conductivity is directly proportional to the cross-sectional area of particles, the larger grain size ensures the improved bulk conductivity. In addition, the vertically oriented porous morphology shortens the average travel distance for the charge carriers before they participate in generating photocurrent.

An embodiment of the present invention also relates to a method for controlling the heating rate of a plurality of nanoparticles to transform the plurality of nanoparticles into a plurality of nanorods and nano-cone structures including the steps of providing a sol precursor containing a plurality of nanoparticles, providing a substrate, depositing the sol precursor onto the substrate via a sol-gel technique to form a plurality of densely stacked nanoparticles, annealing the sol precursor at a controlled heating rate, wherein the controlled heating rate is from about 10° C./min to about 70° C./min, preferably about 60° C./min, and cooling down the precursor to form a plurality of nanorods and nano-cone structures. The cooling step should proceed naturally, with the furnace door closed until the contents reach room temperature.

Without intending to be limited by theory it is believed that the present method provides an improved method for fabricating the invention here. The noteworthy facet of this method is its potentiality to tune the structural, morphological, electrical, and mechanical properties of the material via a simple and executable protocol for various applications.

Turning to the figures, FIG. 1A shows a schematic illustration of $BiVO_4$ thin films deposition protocol by spin coating method. In Step 1 of this process, 0.6 grams of $Bi(NO_3)_3 \cdot 5H_2O$ is added to 3.604 mL ethylene glycol in a beaker. The mixture is sonicated for 10 minutes and in Step 2, 2 mL of Glacial Acetic Acid and 1 mL DI water are added to form Mixture A. Mixture A is sonicated for 10 minutes. In Step 3, 0.6 g of vanadyl acetylacetonate ($VO(acac)_2$) is added to form Mixture B. Mixture B is sonicated for 30 minutes. In Step 4, 0.472 g of polyethylene glycol (PEG) is added to Mixture B to form the $BiVO_4$ ink.

FIG. 1A also shows that 0.5 mL of the $BiVO_4$ ink is added dropwise onto an FTO substrate and then spin coated at 1200 rpm for 10 seconds, and 1500 rpm for 40 seconds to form a coated substrate. The coated substrate is annealed in a furnace with various controlled heating rates of from between 10 to 70° C./min until it reaches 475° C. where it is maintained for 1.5 hours. The process creates a 220 nm thick $BiVO_4$ film on the FTO substrate.

Figure 1B:
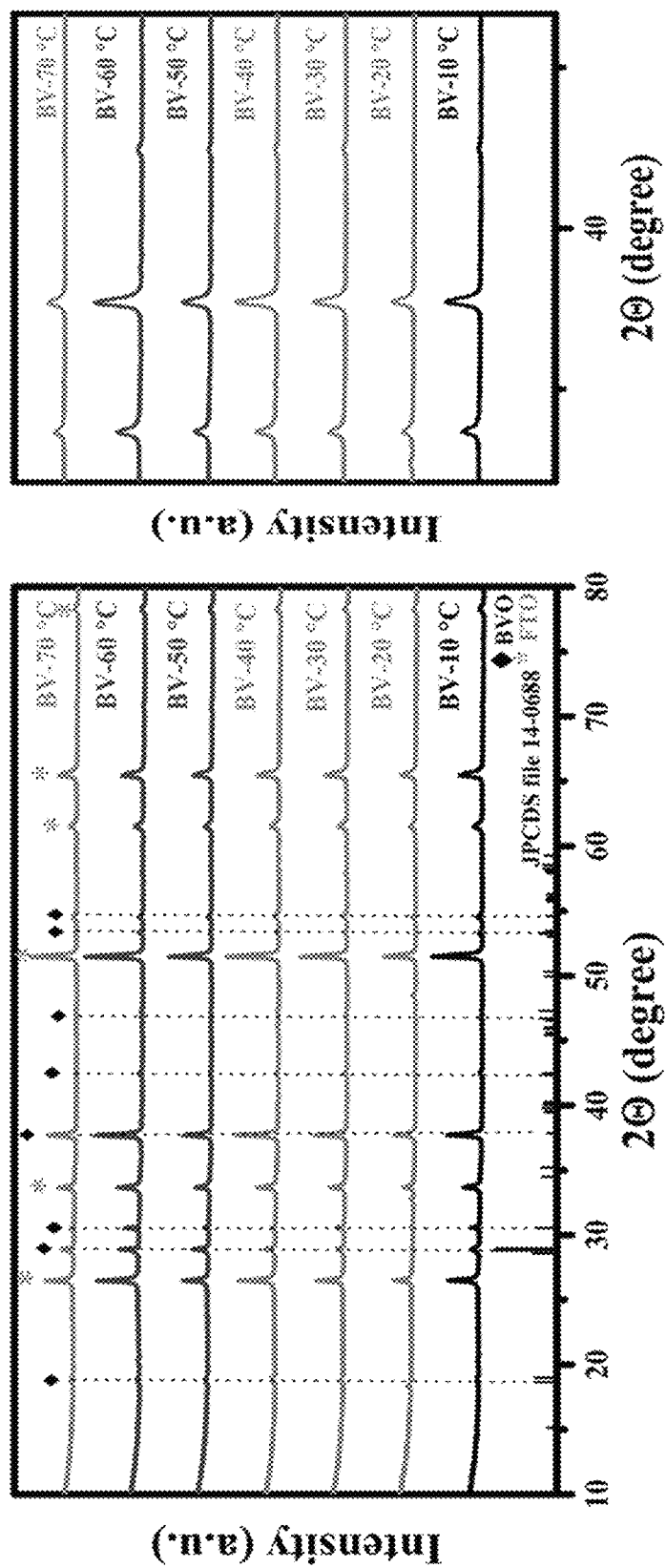
FIG. 1B shows XRD patterns of $BiVO_4$ thin films (BV-10° C. to BV-70° C.) showing well coincidence with JCPDS 14-0688 and a zoom graph of the main peak for monoclinic bismuth vanadate.

FIG. 1B shows XRD patterns of $BiVO_4$ thin films (BV-10 to 70° C.) annealed at different heating rates showing well coincidence with JCPDS 14-0688 which is assigned to the monoclinic scheelite type phase of $BiVO_4$ that is found to be the best polymorph for photogenerated applications. The zoom graph on the right shows the main peak for monoclinic bismuth vanadate that is present in all of the samples. In XRD plots, the narrow base width and the sharpness of peaks confirm the high degree crystallinity of samples. BV-60° C. has the sharpest diffraction peaks among all the samples which means that BV-60° C. exhibits the highest crystallinity.

Figure 1C:
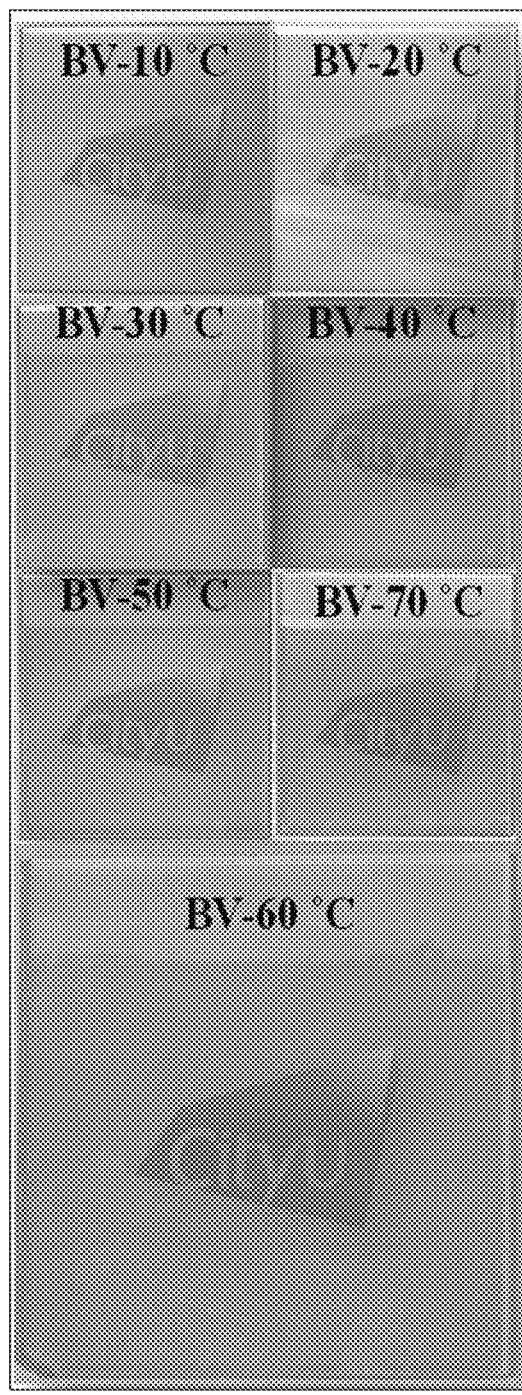
FIG. 1C shows digital photographs of samples at selected heating rates.

FIG. 1C shows digital photographs of samples at selected heating rates indicating that heating rates of from 10° C./min to 70° C./min are all successful, and 60° C./min is the most successful.

Figure 1D:
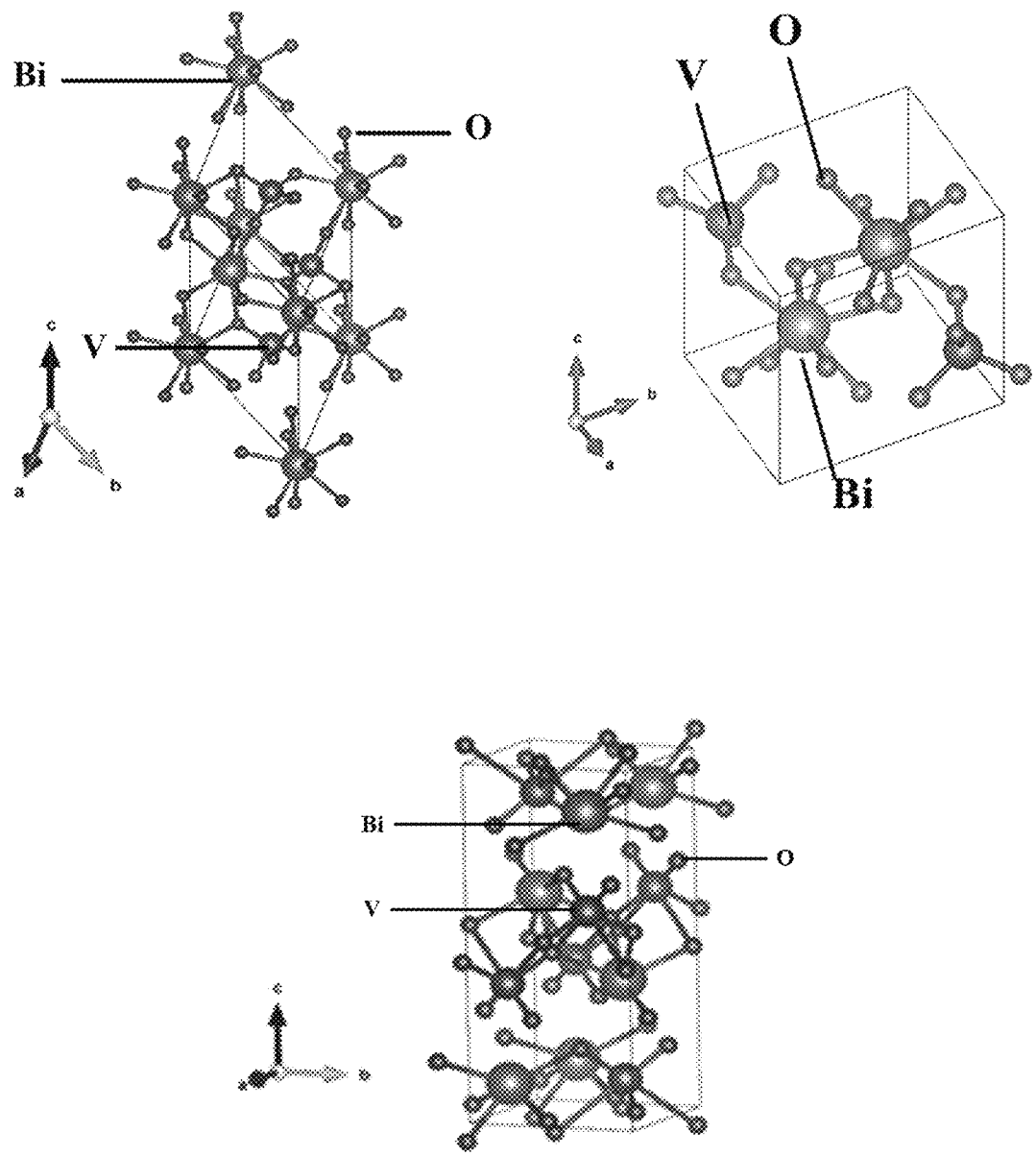
FIG. 1D shows crystal structures of different polymorphs of $BiVO_4$.

FIG. 1D shows crystal structures of three polymorphs of $BiVO_4$. Bismuth vanadate has three polymorphs, from top to bottom, Dreyerite (tetragonal zircon), Clinobisvanite (monoclinic scheelite), and Pucherite (orthorhombic). Among these, the crystallographic and electronic properties of the monoclinic scheelite $BiVO_4$ show a good correlation with photocatalytic activity. The orthorhombic polymorph of $BiVO_4$ is a natural crystal structure while tetragonal and monoclinic polymorphs can be prepared in laboratories. The band gap of monoclinic scheelite is lower than tetragonal zircon polymorph (i.e., $m_s$=2.4 eV and $t_z$=2.9 eV) that makes monoclinic $BiVO_4$ a better aspirant for various applications. Moreover, the crystallographic structure of monoclinic scheelite comes with more distortions in bond angles and bond lengths. This serves as another factor in the superior photocatalytic activity of monoclinic scheelite $BiVO_4$, as compared to the other structures.

Figure 2A:
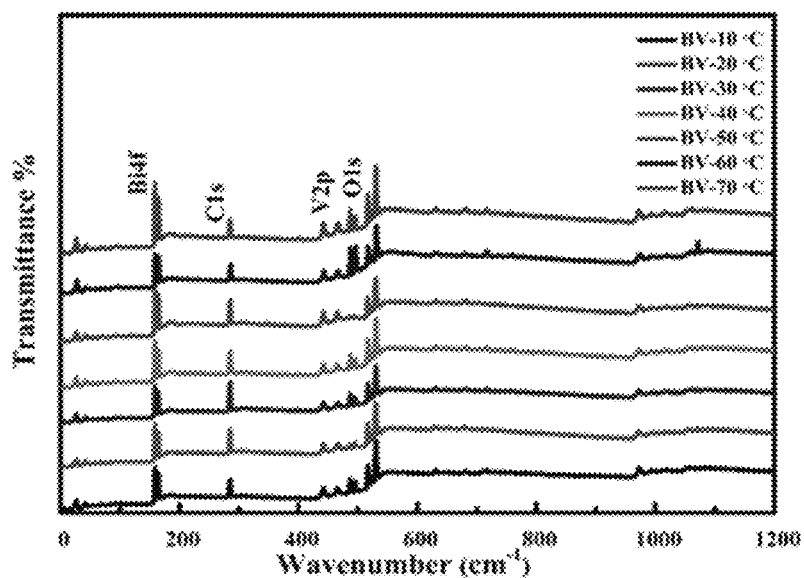
FIG. 2A shows high-resolution XPS elemental survey plots confirming the presence of Bi4f, V2p, and O1s bands.

FIG. 2A shows high-resolution XPS elemental survey plots confirming the presence of Bi4f, V2p, and O1s bands. X-ray photoelectron spectroscopy is used to verify the influence of annealing conditions and the morphology on the bonding between elements of $BiVO_4$. The peaks of Bi4f, C1s, V2p and O1s are shown in all samples, validating the presence only of Bi, V and O elements.

Figure 2B:
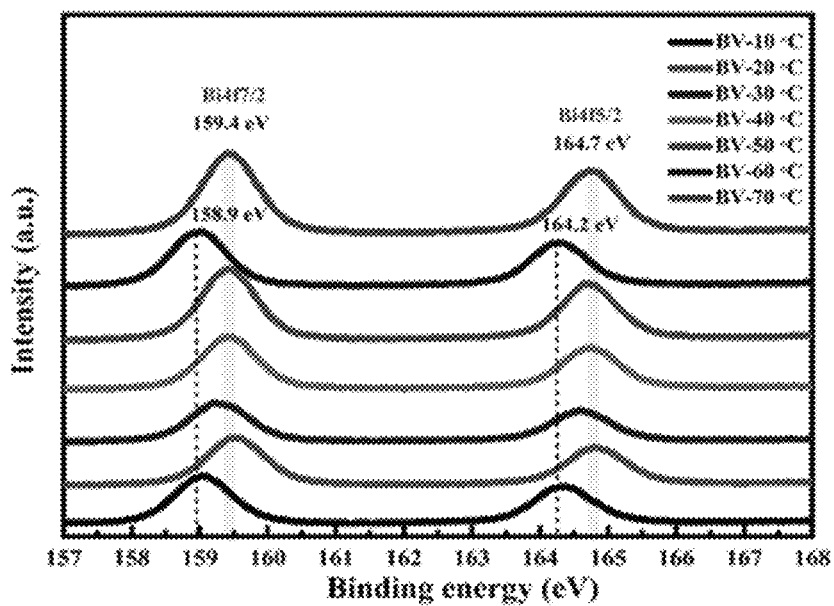
FIG. 2B shows the splitting signals of Bi4f to $Bi4f_{7/2}$ and $Bi4f_{5/2}$.

FIG. 2B shows the splitting signals of Bi4f to $Bi4f_{7/2}$ and $Bi4f_{5/2}$. The splitting signals are at 159.4 eV and 164.7 eV for BV-30° C., BV-40° C., BV-50° C., and BV-70° C., which attributes to the $Bi^{3+}$ oxidation state. In contrast, a positive peak shift towards the higher binding energy is observed for BV-20° C., suggesting stronger bismuth bonding in this sample. BV-10° C. and BV-60° C. shifts to the lower binding energy with the most negligible B.E. value as 158.9 eV and 164.2 eV for Bi4f bonding in BV-60° C.

Figure 2C:
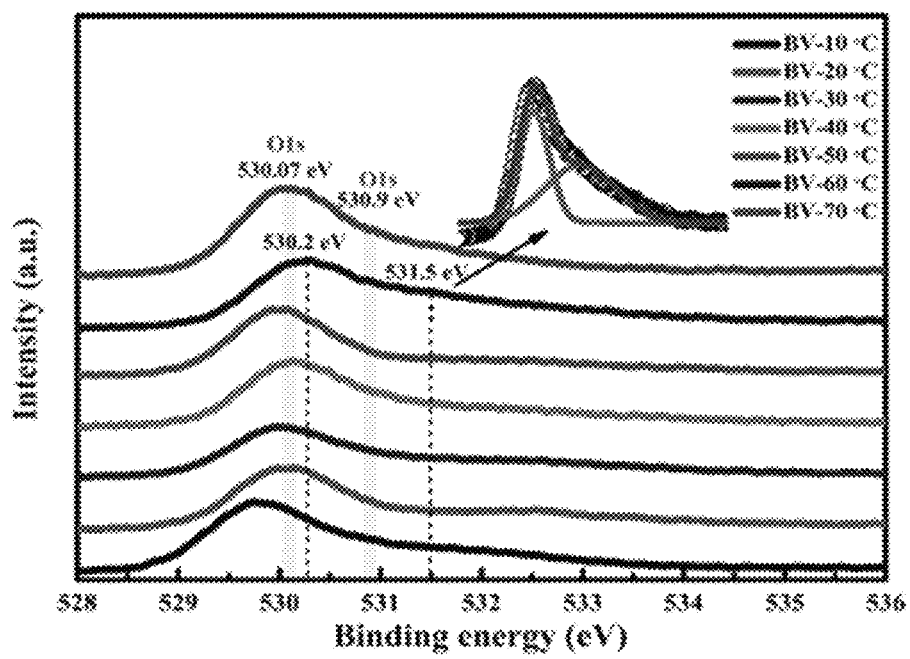
FIG. 2C shows the O1s peaks observed for as-deposited $BiVO_4$ samples with an obvious peak observed at 531.5 eV for BV-60° C. referring to the presence of oxygen vacancies in this sample.

FIG. 2C shows the O1s peaks observed for as-deposited $BiVO_4$ samples with a noticeable peak observed at 531.5 eV for BV-60° C., referring to the presence of oxygen vacancies in this sample. The major peaks for BV-20° C., BV-30° C., BV-40° C., and BV-70° C. are observed at 530.07 eV and 530.9 eV in O1s spectrum with minor shifting and are assigned to O bonded within a regular oxide crystal ($O_2^-$) in $BiVO_4$ and that of adsorbed hydroxyl groups on the surface, respectively.

Figure 2D:
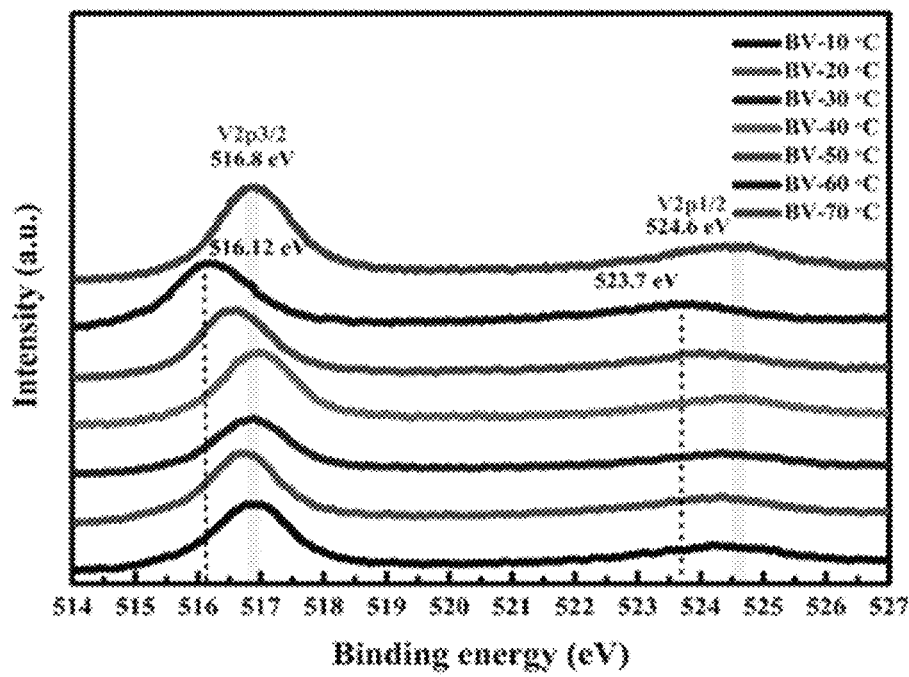
FIG. 2D shows the splitting signals of V2p to $V2p_{3/2}$ and $V2p_{1/2}$.

FIG. 2D shows the splitting signals of V2p to $V2p_{3/2}$ and $V2p_{1/2}$. The peaks of the splitting signals $V2p_{3/2}$ and $V2p_{1/2}$ are observed at 516.8 eV and 524.6 eV for BV-10° C., BV-30° C., BV-40° C., and BV-70° C. They are characteristic peaks of $V^{5+}$ species. BV-60° C. undergoes a major low-energy shift of Bi4f and V2p binding energies compared to other samples, indicating the presence of oxygen vacancies that increased electron density for Bi and V atoms.

Figure 3A:
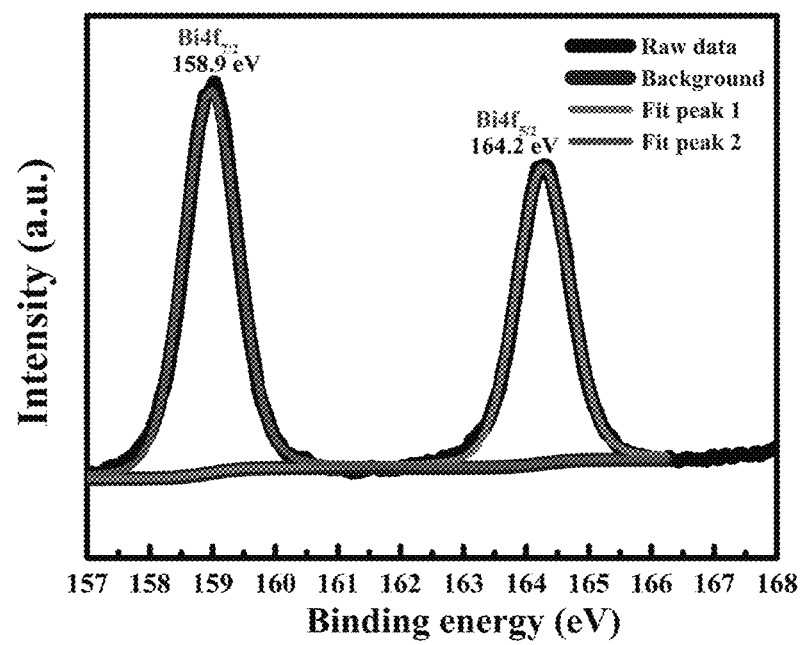
FIG. 3A shows XPS peaks deconvolution for splitting bands of Bif4 (BV-60° C.)
Figure 3B:
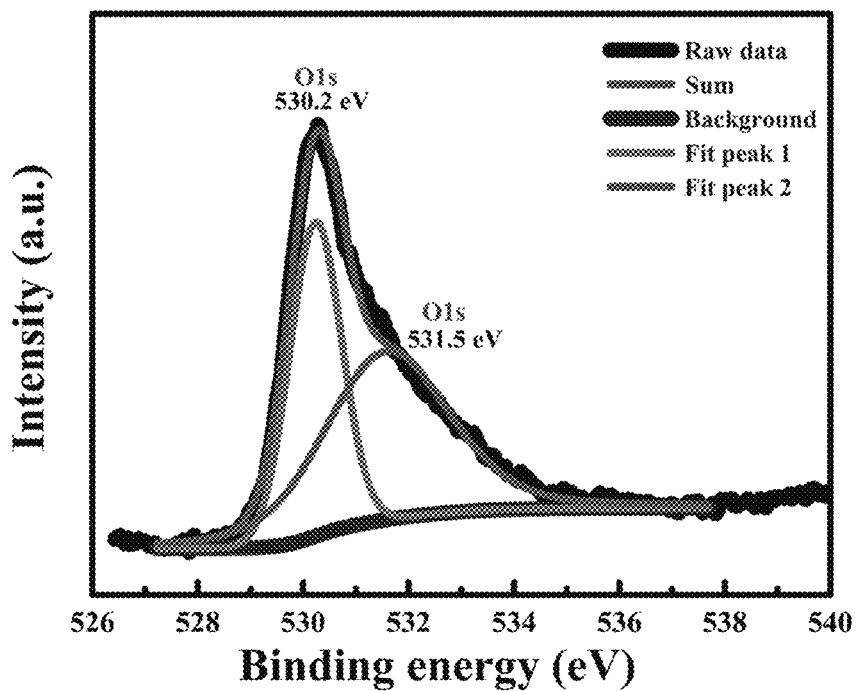
FIG. 3B shows XPS peaks deconvolution for splitting bands of O1s (BV-60° C.)
Figure 3C:
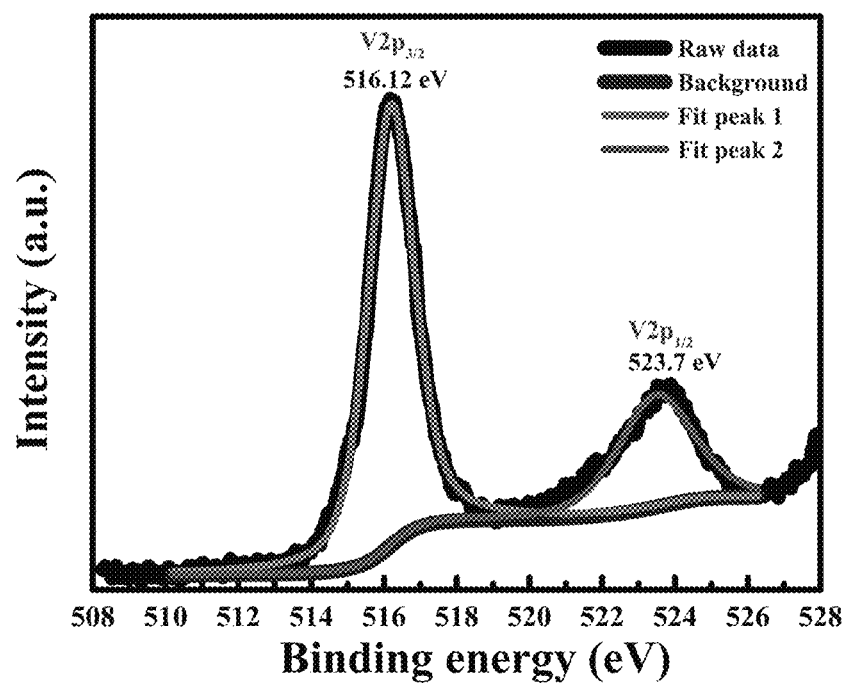
FIG. 3C shows XPS peaks deconvolution for splitting bands of V2p (BV-60° C.)

FIGS. 3A-3C shows XPS peaks deconvolution for splitting bands of Bif4, O1s, and V2p (BV-60° C.). An intense peak at 531.5 eV for O1s indicates the richness of BV-60° C. in oxygen vacancies, also confirmed by FIG. 2C.

Figure 4A:
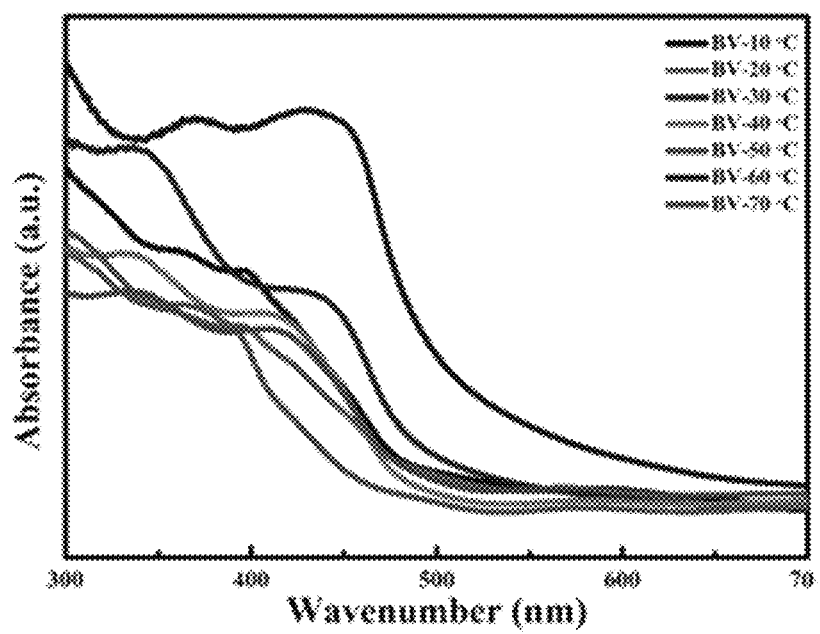
FIG. 4A shows UV-Visible absorption spectra of as-deposited $BiVO_4$ thin films.

FIG. 4A shows UV-Visible absorption spectra of as-deposited $BiVO_4$ thin films. All the samples show the strong absorption in the visible light region with the most intense absorption exhibited by BV-60° C.

Figure 4B:
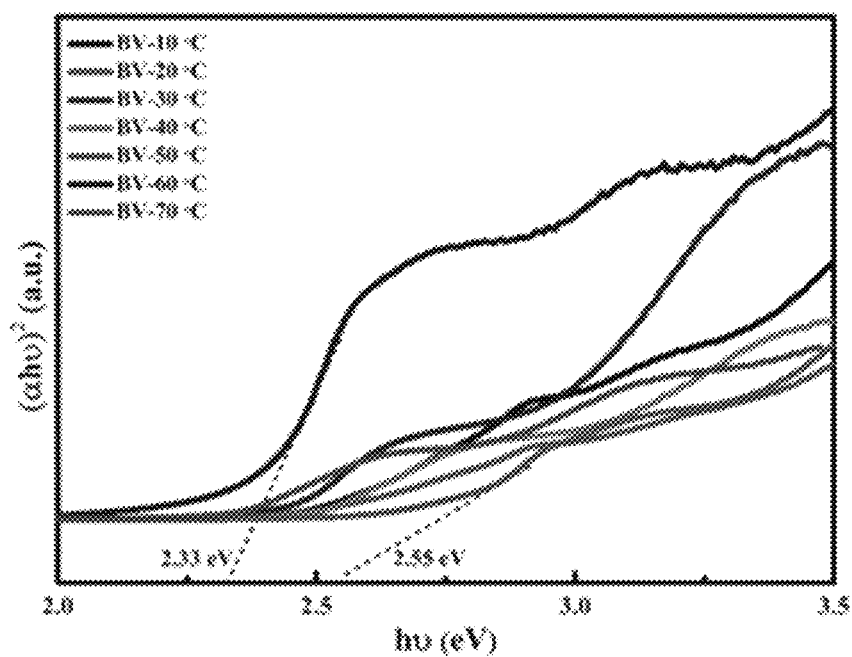
FIG. 4B shows an estimation of bandgap energies using Tauc relationship.

FIG. 4B shows an estimation of bandgap energies using Tauc relationship. A bandgap reduction can be observed from 2.55 eV to 2.33 eV due to the introduction of shallow bands inside the bandgap of $BiVO_4$ by oxygen vacancies generation. These electronic defects reduce the bandgap energy significantly to promote photoactivity of the material, which is illustrated in FIG. 4C.

Figure 4C:
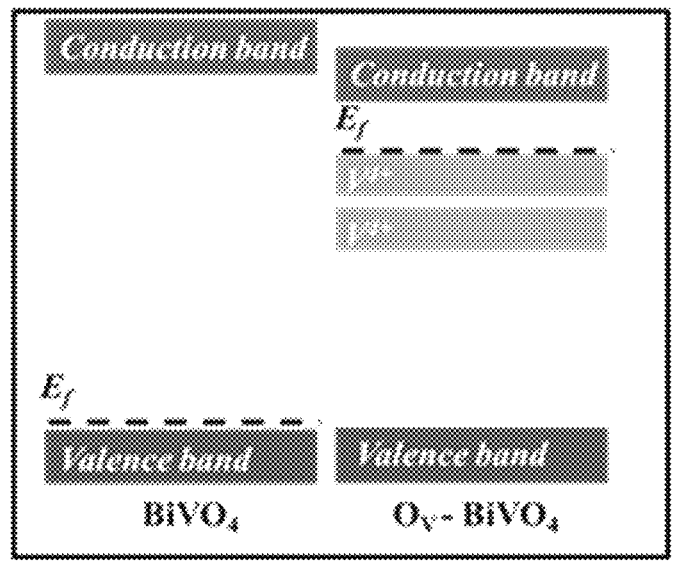
FIG. 4C shows an illustration of shallow energy levels formation due to oxygen vacancies in $BiVO_4$.

FIG. 4C illustrates shallow energy levels formation due to oxygen vacancies in $BiVO_4$.

Figure 4D:
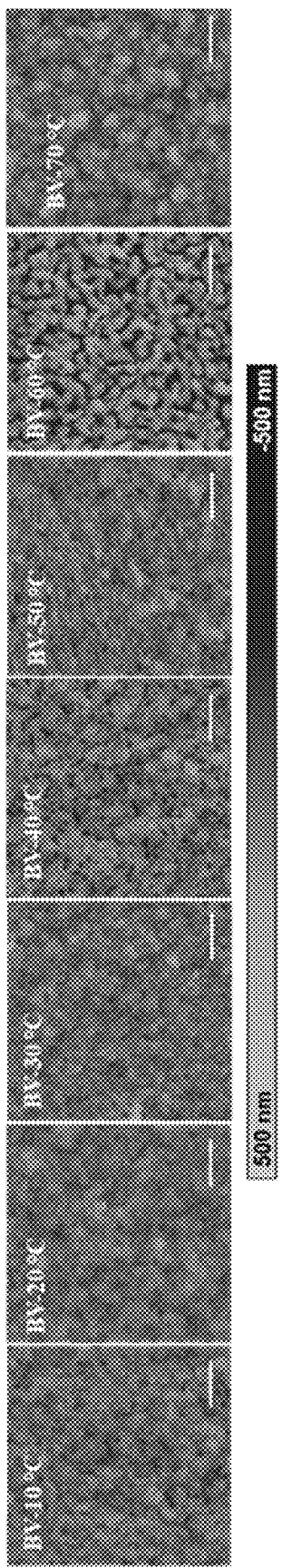
FIG. 4D shows three-dimensional topographic AFM images for BV-10° C., BV-20° C., BV-30° C., BV-40° C., BV-50° C., BV-60° C., and BV-70° C.

FIG. 4D shows three-dimensional topographic AFM images for BV-10° C., BV-20° C., BV-30° C., BV-40° C., BV-50° C., BV-60° C., and BV-70° C. All images exhibit densely stacked short color morphology that converted to long and sharp nano-cones with globular particles. BV-60° C. shows the highest roughness and the highest peaked cones. The measured values are shown in Table 2. Moreover, the surface roughness and average maximum height for these samples estimate the morphological compatibility of the samples with output performance.

Figure 5A:
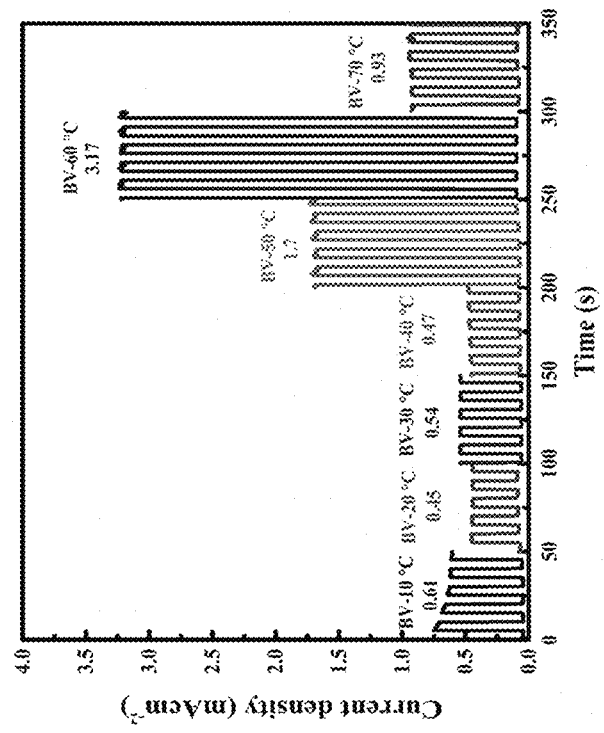
FIG. 5A shows chopped transient current density under the SE (substrate to electrolyte) illumination at 1.23 V vs. RHE.
Figure 5B:
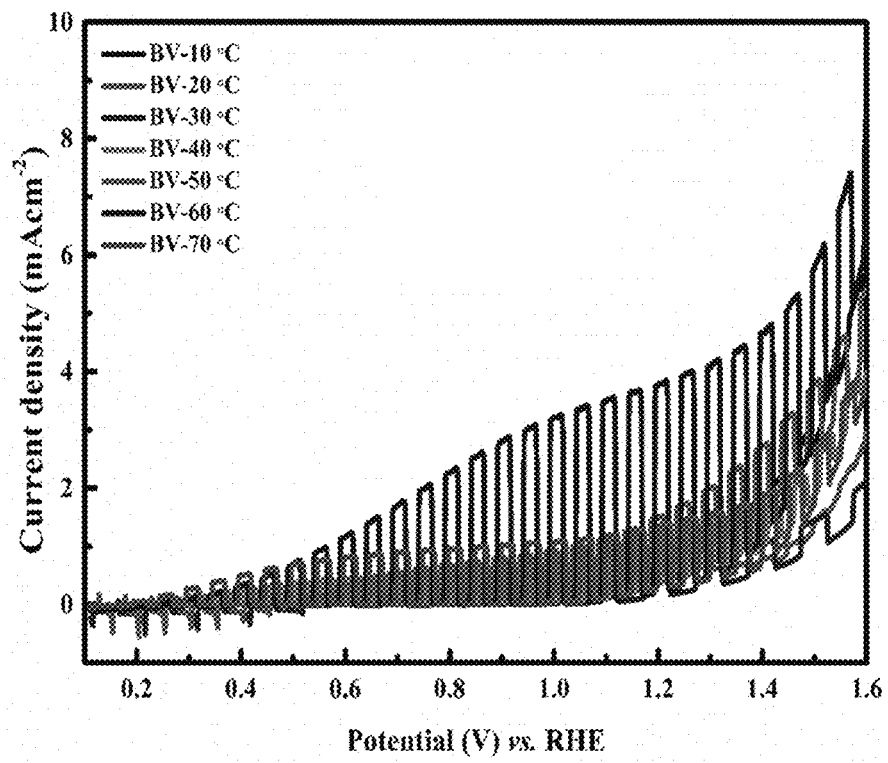
FIG. 5B shows linear sweep voltammetry (J-V) plots.

FIG. 5A shows chopped transient current density under the SE (substrate to electrolyte) illumination at 1.23 V vs. RHE for water splitting. FIG. 5B shows linear sweep voltammetry (J-V) plots. I-t curves (FIG. 5A) and J-V curves (FIG. 5B) with a conventional three-electrode cell system at a scan rate of 10 $mVs^{-1}$ under AM 1.5G illumination (100 $mWcm^{-2}$) indicate the PEC water splitting performance of $BiVO_4$ films. The PEC performance evaluates the impact of the variation in heating rate while depositing the thin films.

The photocurrent density of BV-60° C. is the highest among all the samples at 3.17 mAcm$^{-2}$ at 1.23 V vs. RHE.

Figure 6:
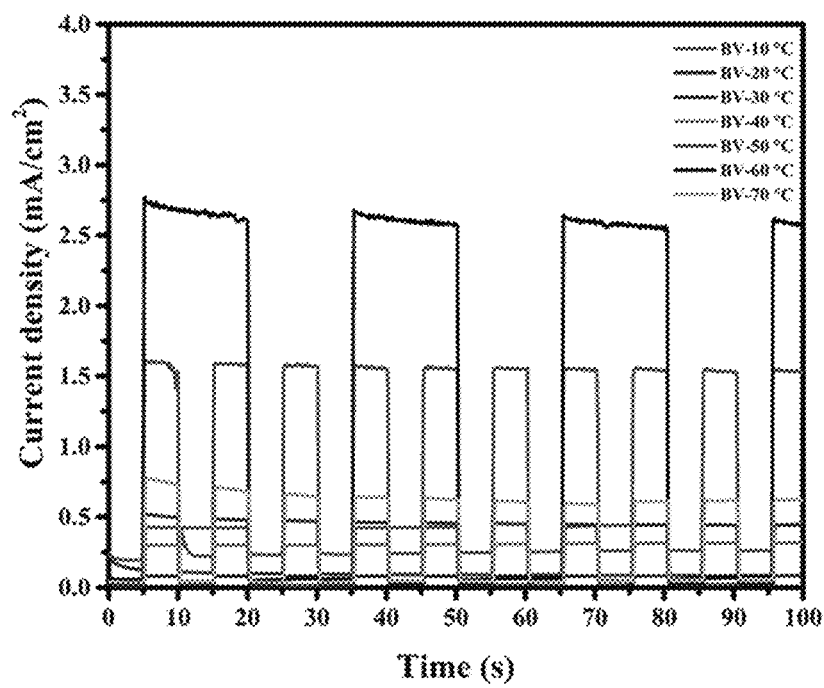
FIG. 6 shows chopped transient current density under the EE (electrode to electrolyte) illumination at 1.23 V vs. RHE.

FIG. 6 shows chopped transient current density under the EE (electrode to electrolyte) illumination at 1.23 V vs. RHE. The EE illumination output current density is comparatively lower for all the samples. The EE illumination output current density of BV-60° C. is the highest among all the samples.

Figure 7:
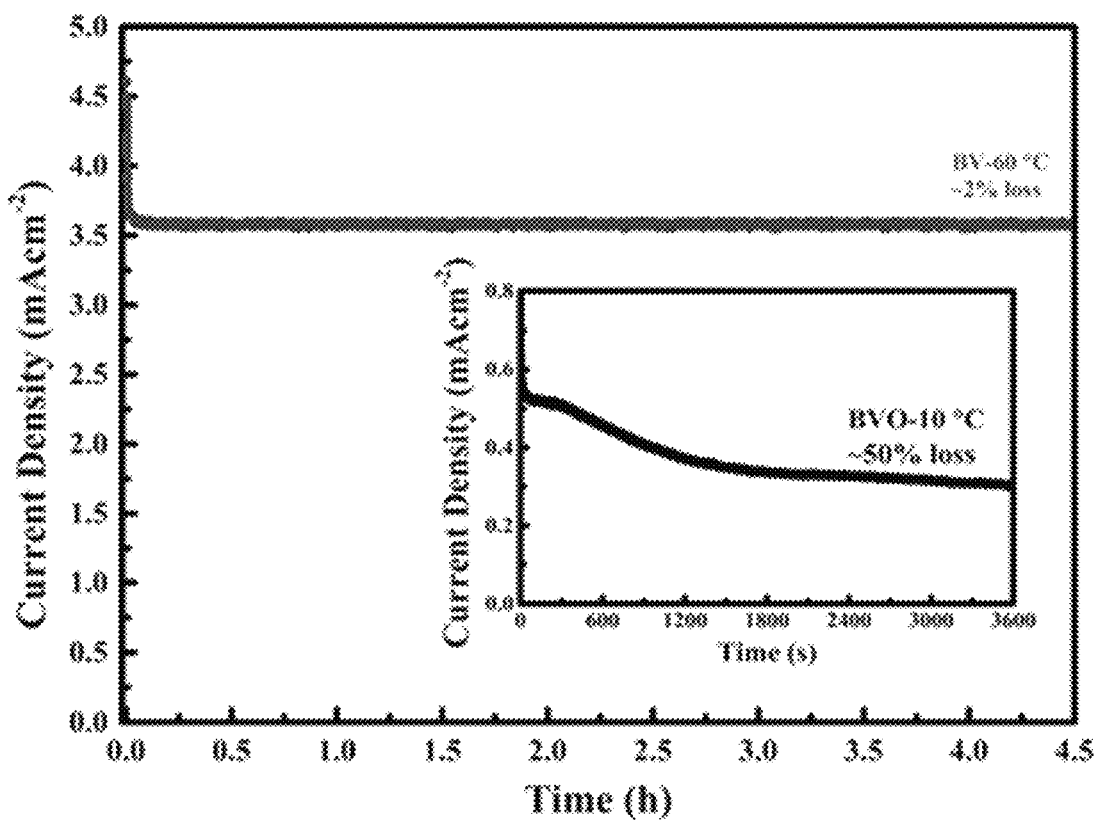
FIG. 7 shows stability test of BV-60° C. for 4.5 hours compared with the BV-10° C. (inset).

FIG. 7 shows stability test of BV-60° C. for 4.5 hours compared with the BV-10° C. (inset). BV-60° C. exhibits outstanding durability against aqueous electrolyte with a modest drop of 2% photocurrent density. In contrast, BV-10° C. loses 50% of its initial photocurrent density within one-hour of stability testing.

Figure 8A:
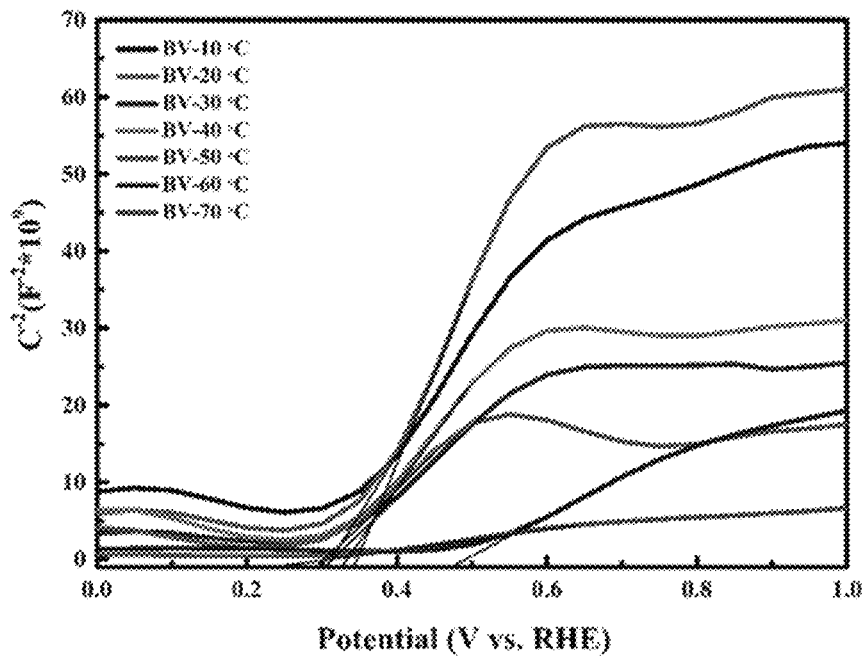
FIG. 8A shows Mott-Schottky plots of pristine $BiVO_4$ in 0.1M $Na_2SO_4$+0.1M $Na_2SO_3$; pH ~9.26 with 5 mV AC amplitude, and 1 kHz frequency.

FIG. 8A shows Mott-Schottky plots of pristine BiVO$_4$ in 0.1M Na$_2$SO$_4$+0.1M Na$_2$SO$_3$; pH ~9.26 with 5 mV AC amplitude and 1 kHz frequency. The positive slopes of all the curves indicate that BiVO$_4$ is an n-type semiconductor. The slopes estimate charge carrier density for BV-60° C. comparatively much higher than the rest of the samples, and BV-60° C. is found least in carrier density.

Figure 8B:
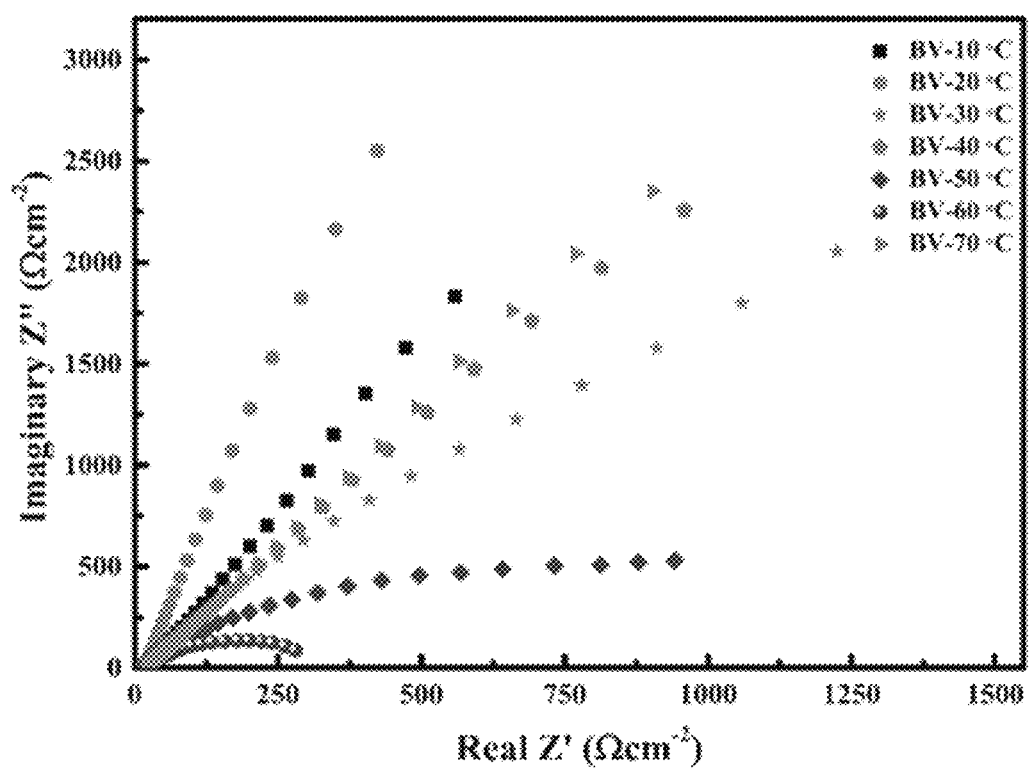
FIG. 8B shows Nyquist plots of $BiVO_4$ thin films under SE illumination.

FIG. 8B shows Nyquist plots of BiVO$_4$ thin films under SE illumination. In the Nyquist plots, the smaller the diameter of the semicircle, the better the charge carrier transportation. The sequence of decrease in the diameter of semicircles is the same under dark conditions and illumination BV-20° C.>BV-10° C.>BV-70° C.>BV-40° C.>BV-30° C.>BV-50° C.>BV-60° C., as a result of this suggesting a prominent decrease in charge carrier transfer resistance down the sequence.

Materials

All the chemicals are from Sigma Aldrich and used in their purest available form without any further treatment. The requisite ingredients (purity indicated in parentheses) to prepare the BiVO$_4$ ink include Bi(NO$_3$)$_3$·5H$_2$O (≥99.99%), ethylene glycol (≥99.0%), glacial acetic acid (≥99.7%), DI water, VO(acac)$_2$ (≥98%), and polyethylene glycol (≥99.0%). The electrolyte composed of DI water, Na$_2$SO$_4$ (≥99.0%), and Na$_2$SO$_3$ (≥98%).

Example 1

Synthesis of BiVO$_4$ Ink

The synthesis of BiVO$_4$ thin films is performed in air. A 0.6 g of Bi (NO$_3$)$_3$·5H$_2$O is added to 4.0 g (3.604 mL) of ethylene glycol (EG) followed by sonication for 10 minutes to transparentize the suspension. 2.0 mL of glacial acetic acid with 1.0 mL of deionized water is supplied to this solution and sonicated for a further 10 minutes. A 0.6 g dose of VO (acac)$_2$ with 30 minutes of sonication transformed the transparent solution into a dark turquoise color. To this blend, 0.472 g powder of the polyethylene glycol (PEG) is added to control the morphology of as deposited BiVO$_4$ thin films. The solution achieved viscous texture after the addition of this triblock copolymer Pluronic F-108 (PEG), and hence the ink is ready for spin coating.

Example 2

Fabrication of BiVO$_4$ Film

FTO glasses are bathed in an ultrasonic liquid processor with acetone, ethanol, and DI water for 20 minutes each, respectively, followed by drying in a heating oven at 60° C. The films are deposited by dripping 0.5 mL of the BiVO$_4$ ink onto an FTO-coated glass substrate spun at 1200 rpm followed by 1500 rpm for 10 seconds and 35 seconds, respectively. Lastly, the films are shifted right away to the furnace for annealing at 475° C. for 1.5 hours by setting the heating rate of the furnace as 10° C., 20° C., 30° C., 40° C., 50° C., 60° C., and 70° C. rise per minute and let them cool down naturally to the ambient temperature. The whole procedure of thin-film deposition takes approximately 12 hours to get a sample ready for testing. This protocol produced ~0.2 microns thick film and the quantity of ink is quite enough to prepare all the seven different samples in a single spin-coating step.

Example 3

Characterization Techniques

X-ray powder diffraction (XRD; Bruker D8 ADVANCE Plus) is performed to obtain the crystal structures of as prepared samples by using Cu-Kα radiation with wavelength ~1.5 Å in the range 10-80° by setting the scan rate 5°/min. X-ray photoelectron spectroscopy (XPS; ThermoFisher ESCALAB™ 250XIb X-ray photoelectron spectrometer) equipped with Al Kα radiation is conducted to explore binding energy of all elements. The UV-Vis spectroscopy (Cary 50 conc UV-visible spectrophotometer) is performed in the range 300-700 nm. The AFM (Bruker diMultimode V® AFM) data is obtained with Nanoscope software and AppNano ACTA tip (ROC=6 nm) in tapping mode.

Example 4

PEC Cell Assembly and Measurements

The PEC performance of as-deposited BiVO$_4$ thin films is tested by assembling the standard three electrode cell system in a deionized water-based electrolyte (0.1M Na$_2$SO$_4$+0.1M Na$_2$SO$_3$; pH ~9.26). All the as-prepared BiVO$_4$ thin films are cut into smaller pieces and secured the outer sides with epoxy glue to steer clear of any current leakage and define the effective area as 0.7 cm$^2$. Before employing the electrolyte, it needs to be purged in nitrogen gas for half an hour to remove any residual dissolved oxygen content. The BiVO$_4$ photoanode is employed as the working electrode, whereas the platinum wire and Ag/AgCl electrodes serve as counter electrode and reference electrode, respectively. The potential is calculated with correction by the Nernst equation 1:

$$E_{RHE}=E_{SCE}+0.0591 \text{ pH}+0.209 \quad (1)$$

Here, applied bias potential is $E_{Ag/AgCl}$ and the conversion factor is 0.209 from the Ag/AgCl electrode to the reversible hydrogen electrode (RHE) scale. All PEC data are recorded by using CH Instrument electrochemical workstation model CHI6011E. A 300W Xenon lamp (NewBet HSX-F300) irradiated the simulated 1 sun (AM 1.5G) and a calibrated power density of 100 mWcm$^{-2}$. A bias of 1.23 V [53] vs. RHE is applied to measure the transient photocurrent density under chopped illumination. Linear sweep voltammetry (LSV) is conducted at the scan rate of 10 mVs$^{-1}$ by sweeping the potential from the negative to the positive side. The electrochemical impedance spectroscopy (EIS) is performed at an open circuit voltage in a frequency range 1 Hz to 10 kHz. The flat band potential is estimated by Mott-Schottky (MS) curves drawn using the capacitances of the BiVO$_4$ photoanodes recorded upon applied bias. A sinusoidal modulation of 5 mV is applied using a frequency of 5 Hz. The MS plots are obtained using equation 2:

$$\frac{1}{C^2}=\frac{2\left(V-V_f-\frac{kT}{e}\right)}{e\varepsilon\varepsilon°N_dA^2} \quad (2)$$

where, C is the capacitance of photoanode, e is the electronic charge (C), $\varepsilon$ is the dielectric constant of $BiVO_4$, $\varepsilon°$ is the permittivity of free space, V is the applied bias (versus RHE), $V_f$ is the flat band potential (versus RHE), k is the Boltzmann constant, Nd is the donor density for n-type semiconductor ($cm^{-3}$), A is the surface area of photoanode, and T is the temperature (K).

Example 5

X-Ray Diffraction Spectroscopy (XRD)

FIG. 1B represents the XRD plots of differently annealed $BiVO_4$ thin films. The obtained diffraction peaks are in good correspondence with JCPDS card number 14-0688 assigned to the monoclinic scheelite type phase of $BiVO_4$ found to be the best polymorph for photogenerated applications. The narrow base width and the sharpness of peaks confirm the high degree crystallinity of samples. The monoclinic $BiVO_4$ is the most photoactive phase compared to its orthorhombic and tetragonal polymorphs. The FTO substrate and monoclinic $BiVO_4$ peaks are observed only in XRD pattern. No peaks for other polymorphs of $BiVO_4$ or any other impurity is observed for any sample, which confirmed the purity of the samples as well.

Further analysis shows that BV-60° C. exhibits the highest crystallinity as its diffraction peaks are even sharper among all the samples. Moreover, the sharpness of peaks is the property of the crystallite size. If the crystallite size increases, the peaks will be sharper. This observation validates the morphological changes recorded by AFM topographic study of the $BiVO_4$ samples. The magnified plotting of XRD peaks for better comparison is shown in FIG. 1B and the planes associated with each peak are shown in Table 1.

TABLE 1 indicates XRD peaks observed in all samples and their respective planes

| XRD Peaks | Associated planes |
|---|---|
| 18.91 | 011 |
| 28.8 | 112 |
| 30.4 | 004 |
| 37.6 | 211 |
| 42.3 | 105 |
| 46.7 | 024 |
| 53.4 | 116 |
| 54.7 | 312 |

Example 6

X-Ray Photoelectron Spectroscopy (XPS)

The surface chemical status and the core level bonding of samples are determined using XPS. XPS is conducted to get insights into the influence of annealing conditions and the morphology on the bonding between elements of $BiVO_4$. From FIG. 2A, the survey spectra of $BiVO_4$ validate the presence only of Bi, V, and O elements in all the samples, indicating the purity of $BiVO_4$ thin films.

The splitting signals $Bi4f_{7/2}$ and $Bi4f_{5/2}$ (FIG. 2B) for BV-30° C., BV-40° C., BV-50° C., and BV-70° C. are at 159.4 eV and 164.7 eV, respectively, which attributes to the Bi' oxidation state. The peak shift is quite negligible among these four samples. In contrast, a positive peak shift towards the higher binding energy is observed for BV-20° C., hereby suggesting stronger bonding of bismuth in this sample. On the other hand, BV-10° C. and BV-60° C. shifts to the lower binding energy with the least B.E. value as 158.9 eV and 164.2 eV for Bi4f bonding in BV-60° C. The peaks observed at 516.8 eV and 524.6 eV (FIG. 2D) are the splitting signals $V2p_{3/2}$ and $V2p_{1/2}$ for BV-10° C., BV-30° C., BV-40° C., and BV-70° C., which are characteristic peaks of $V^{5+}$ species. The negative peak shift is observed for BV-20° C., BV-50° C., and BV-60° C. Interestingly, BV-60° C. undergoes a prominent low-energy shift of Bi4f and V2p binding energies compared to other samples indicating the presence of $V^{4+}$ ions related to oxygen vacancies that resulted in an increase of electron density for Bi and V atoms.

XPS analysis of metal oxides revealed two types of oxygen oxidation states: the peaks formed in the range 529.5-530.5 eV are the splitting peaks of the O1s band and are the characteristic peaks of the $O^{2-}$ oxidation state. The peaks formed in the region between 531 eV-532 eV, on the other hand, suggest the existence of another O1s species with lower electron density than the $O^{2-}$ state, and thus it is assignable to $O^-$ ions. The major peaks for BV-20° C., BV-30° C., BV-40° C., and BV-70° C. are observed at 530.07 eV and 530.9 eV in O1s spectrum (FIG. 2C) with minor shifting and are assigned to O bonded within a regular oxide crystal ($O^{2-}$) in $BiVO_4$ and that of adsorbed hydroxyl groups on the surface, respectively. BV-10° C. and BV-50° C. moved toward lower binding energy values with no change in oxidation states. The obvious evidence of the presence of oxygen vacancy in BV-60° C. comes from the presence of a pretty sharp peak at 531.5 eV (FIG. 3B, an intense peak at 531.5 eV for O1s indicating the richness of this sample in oxygen vacancies) indicates that the thermal treatment for BV-60° C. helped to create $V^{4+}$ species in $BiVO_4$ lattice, during the reaction between Bi $(NO_3)_3$ and VO $(acac)_2$. Afterward, the partial reduction of $V^{5+}$ to $V^{4+}$ ions leads to the generation of abundant oxygen vacancies as shallow donors of electrons. The reason for a higher concentration of $V^{4+}$ species and oxygen vacancies in BV-60° C. may be attributed to its porous network structure with higher surface-exposed area for defects formation hereby proving the presence of oxygen vacancies to advantageous for the improvement in the photocatalytic performance of the $BiVO_4$ material.

Example 7

UV-Visible Spectroscopy

It is crucial to investigate optical properties in order to gain a better understanding of PEC output performance. FIG. 4A and b show the UV-Visible absorption spectra of seven differently treated $BiVO_4$ thin films along with bandgap evaluation estimated by applying Tauc relation (equation 3) as mentioned below $$\alpha h\nu = C(h\nu - E_g)^{n2} \qquad (3)$$

where $\alpha$ is the absorption coefficient, h is the Plank's constant, $\nu$ is the frequency of incident light, C is a constant, which is the function of the band telling parameter, and $E_g$ is the bandgap energy (eV). The value of n is assigned 1 for $BiVO_4$, as it is an indirect bandgap semiconductor. The monoclinic scheelite type $BiVO_4$ undergoes the visible light absorption by the transition from valence band composed of the Bibs band or Bi6s+O2p hybrid orbital to the V3d conduction band. It can be seen that all the samples show the strong absorption in the visible light region with most intense absorption exhibited by BV-60° C. for which a reduction of bandgap can also be observed from 2.55 eV to 2.33 eV due to the introduction of shallow bands inside the bandgap of BiVO$_4$ by oxygen vacancies generation. These electronic defects reduce the bandgap energy significantly to promote photoactivity of the material, better illustrated by the schematic FIG. 4C.

TABLE 2

The average arithmetic roughness of the surface ($R_a$), root mean square values of the roughness ($R_q$), and average maximum height ($R_{mp}$) of as-prepared BiVO$_4$ thin films are obtained from atomic force microscopy.

| Roughness Parameter | Samples names | | | | | | |
| --- | --- | --- | --- | --- | --- | --- | --- |
| | BV-10° C. | BV-20° C. | BV-30° C. | BV-40° C. | BV-50° C. | BV-60° C. | BV-70° C. |
| $R_a$ (nm) | 15.8 | 15.7 | 17.6 | 21.6 | 17.7 | 29.0 | 20.2 |
| $R_q$ (nm) | 19.9 | 19.6 | 22.1 | 27.7 | 22.7 | 37.3 | 25.7 |
| Avg Max Height (nm) | 9.21 | 7.45 | 11.4 | 14.3 | 13.4 | 24.0 | 9.2 |

Example 8

Atomic Force Microscopy (AFM)

BiVO$_4$ thin film topography AFM pictures (5×5 μm) exhibit densely stacked short colours morphology that converted to long and sharp nano-cones with globular particles as their foundation matrix for BV-60° C. The average arithmetic roughness of the surface ($R_a$), root mean square values of the roughness ($R_q$), and average maximum height (Rmp) are estimated from AFM analysis and are furnished in Table 2. The three-dimensional topographic images of as-deposited BiVO$_4$ thin films are furnished in FIG. 4D. BV-60° C. shows the highest roughness values and the highest peaked cones. When compared to the other samples (Table 2), the vertically oriented nano-cones array would provide a greater contact area between the electrolyte and the photoanode, as well as larger particle size. Since the conductivity is directly proportional to the cross-sectional area of particles, hence the larger grain size ensures improved bulk conductivity. In addition, the vertically oriented porous morphology shortened the average travel distance for the charge carriers before they participated in generating photocurrent. Besides, the optimal film thickness is limited by the charge carrier diffusion length.

Example 9

PEC Performance

The impact of the variation in heating rate while depositing the thin films is evaluated by conducting the PEC water splitting performance of BiVO$_4$ films. The PEC measurements are conducted using I-t curves (FIG. 5A) and J-V curves (FIG. 5B) with a conventional three-electrode cell system at a scan rate of 10 mVs$^{-1}$ under AM 1.5G illumination (100 mWcm$^{-2}$). FIG. 5A shows the chopped transient current density under the SE (substrate to electrolyte) illumination at 1.23 V vs. RHE for water splitting, while the EE illumination output current density is furnished in FIG. 6 which is comparatively lower for all the samples due to an increased charge transfer distance for the photoelectrons in this position. As the electrodes are irradiated, they showed a large photocurrent spike due to the presence of a large number of photogenerated electron/hole pairs inside the bulk. This spike decreases owing to the fast charge carrier recombination until the charge generation and their recombination rate balance at a point.

Compared to their photocurrents, the trivial dark current for all the curves of BiVO4 films exhibit their efficient photo-response. The BV-60° C. exhibits a prominent 5-fold increase in photocurrent density of up to 3.17 mAcm$^{-2}$ at 1.23 V vs. RHE. This PEC performance is the highest ever reported for the stable pristine BiVO$_4$ photoelectrode so far. The anticipation is made that the consequential effects of the morphology defects of as-deposited photoanodes are responsible for the efficient PEC performance. The AFM and XPS analysis validated this hypothesis by determining the significant physical and chemical defects.

The 4.5-hour stability testing (FIG. 7) for BV-60° C. reveals outstanding durability against aqueous electrolyte with a modest drop of 2% photocurrent density. While BV-10° C. loses 50% of its initial photocurrent density within one-hour stability testing. The AFM micrographs justifies this expectation, and a detailed discussion on this phenomenon is furnished in the next portion. These results tell that the PEC performance of BiVO$_4$ can be better tuned by optimizing the heating rate during the annealing process of thin films. This strategy predominantly accelerates electron transport and boosts film conductivity. The larger slope of the linear sweep voltammetry (LSV) curves of BV-60° C. substantiates this increase in performance as shown in FIG. 5B.

Example 10

Mott-Schottky Plots

Mott-Schottky (MS) measurement is performed to find the charge carrier density in the BiVO$_4$ electrode and electrolyte interface. The MS curves (FIG. 8A) are obtained from the space charge capacitance values calculates under dark conditions at 1000 Hz frequency. The positive slopes of all the curves indicate that BiVO$_4$ is an n-type semiconductor. The slopes estimate charge carrier density for BV-60° C. comparatively much higher than the rest of the samples, and BV-60° C. is found least in carrier density. A positive shift in the flat band potential (Eth) for BV-60° C. estimates an increase in the bending of the band edges that improves the charge separation and is in parallel with other studies.

Example 11

Electrochemical Impedance Spectroscopy (EIS)

Electrochemical impedance spectroscopy is conducted for characterizing the charge mobility of the interface of the BiVO$_4$ electrode and electrolyte. In the Nyquist plots (FIG. 8B), the smaller the diameter of the semicircle, the better would be the charge carrier transportation. The sequence of decrease in the diameter of semicircles is the same under dark conditions and illumination BV-20° C.>BV-10° C.>BV-70° C.>BV-40° C.>BV-30° C.>BV-50° C.>BV-60° C., hereby suggesting a prominent decrease in charge carrier transfer resistance down the sequence. The BV-60° C. photoanode suppresses the recombination of electron-hole pairs and exhibited efficient charge mobility, whereas the BV-70° C. photoanode shows quite larger $R_{ct}$ value than BV-30° C., BV-40° C., and BV-50° C., resulting in larger charge transfer resistance; in other words, over speeding the heating rate during annealing of the films resulted in poor charge transfer at the EE interface.

REFERENCES

Varadhan, P., et al., An efficient and stable photoelectrochemical system with 9% solar-to-hydrogen conversion efficiency via InGaP/GaAs double junction. Nature communications, 2019. 10(1): p. 1-9.

Wang, H., et al., Highly active deficient ternary sulfide photoanode for photoelectrochemical water splitting. Nature communications, 2020. 11(1): p. 1-11.

Martin, D. J., et al., Visible light-driven pure water splitting by a nature-inspired organic semiconductor-based system. Journal of the American Chemical Society, 2014. 136(36): p. 12568-12571.

Landman, A., et al., Photoelectrochemical water splitting in separate oxygen and hydrogen cells. Nature materials, 2017. 16(6): p. 646-651.

Walter, M. G., et al., Solar water splitting cells. Chemical reviews, 2010. 110(11): p. 6446-6473.

Bard, A. J. and M. A. Fox, Artificial photosynthesis: solar splitting of water to hydrogen and oxygen. Accounts of Chemical Research, 1995. 28(3): p. 141-145.

Fujishima, A. and K. Honda, Electrochemical photolysis of water at a semiconductor electrode. Nature, 1972. 238 (5358): p. 37-38.

Bard, A. J., Photoelectrochemistry and heterogeneous photocatalysis at semiconductors. Journal of Photochemistry, 1979. 10(1): p. 59-75.

Serpone, N. and A. Emeline, Semiconductor Photocatalysis Past, Present, and Future Outlook. 2012, ACS Publications.

Jian, J., et al., Recent advances in rational engineering of multinary semiconductors for photoelectrochemical hydrogen generation. Nano Energy, 2018. 51: p. 457-480.

Hwang, S., et al., Highly efficient and durable III-V semiconductor-catalyst photocathodes via a transparent protection layer. Sustainable Energy & Fuels, 2020. 4(3): p. 1437-1442.

Nozik, A., et al., dependence of hot carrier luminescence on barrier thickness in GaAs/AlGaAs superlattices and multiple quantum wells. Solid state communications, 1990. 75(4): p. 297-301.

Ramprakash, Y, D. Bose, and S. Basu, Transient response in n-InP PEC cells and effect of surface modification. Surface science, 1984. 145(1): p. 175-184.

Ahn, K.-S., et al., ZnO nanocoral structures for photoelectrochemical cells. Applied physics letters, 2008. 93(16): p. 163117.

Mansur, H. S., et al., Photoelectrochemical properties of 'Q-state'CdS particles in arachidic acid Langmuir-Blodgett films. Journal of the Chemical Society, Faraday Transactions, 1995. 91(4): p. 665-672.

Zhang, J., et al., High-performance CdS—ZnS core-shell nanorod array photoelectrode for photoelectrochemical hydrogen generation. Journal of Materials Chemistry A, 2015. 3(2): p. 535-541.

Oh, J., et al., Nanoporous black silicon photocathode for H 2 production by photoelectrochemical water splitting. Energy & Environmental Science, 2011. 4(5): p. 1690-1694.

Jia, J., et al., Solar water splitting by photovoltaic-electrolysis with a solar-to-hydrogen efficiency over 30%. Nature communications, 2016. 7(1): p. 1-6.

Guo, P., et al., Surface & grain boundary co-passivation by fluorocarbon based bifunctional molecules for perovskite solar cells with efficiency over 21%. Journal of materials chemistry A, 2019. 7(6): p. 2497-2506.

Kim, J. H., et al., Hetero-type dual photoanodes for unbiased solar water splitting with extended light harvesting. Nature communications, 2016. 7(1): p. 1-9.

Shi, X., et al., Unassisted photoelectrochemical water splitting exceeding 7% solar-to-hydrogen conversion efficiency using photon recycling. Nature communications, 2016. 7(1): p. 1-6.

Wang, H., et al., Size-related native defect engineering in high intensity ultrasonication of nanoparticles for photoelectrochemical water splitting. Energy & Environmental Science, 2013. 6(3): p. 799-804.

Wang, F., et al., Gradient self-doped $CuBi_2O_4$ with highly improved charge separation efficiency. Journal of the American Chemical Society, 2017. 139(42): p. 15094-15103.

Walsh, A., et al., Band edge electronic structure of $BiVO_4$: elucidating the role of the Bi s and V d orbitals. Chemistry of Materials, 2009. 21(3): p. 547-551.

Jian, J., et al., Embedding laser generated nanocrystals in $BiVO_4$ photoanode for efficient photoelectrochemical water splitting. Nature communications, 2019. 10(1): p. 1-9.

Abdi, F. F., et al., The origin of slow carrier transport in $BiVO_4$ thin film photoanodes: a time-resolved microwave conductivity study. The Journal of Physical Chemistry Letters, 2013. 4(16): p. 2752-2757.

Bhattacharya, A., K. Mallick, and A. Hartridge, Phase transition in $BiVO_4$. Materials Letters, 1997. 30(1): p. 7-13.

Zhao, Y., et al., Surfactant-free synthesis of hyperbranched monoclinic bismuth vanadate and its applications in photocatalysis, gas sensing, and lithium-ion batteries. Chemistry—A European Journal, 2008. 14(5): p. 1601-1606.

Cooper, J. K., et al., Indirect bandgap and optical properties of monoclinic bismuth vanadate. The Journal of Physical Chemistry C, 2015. 119(6): p. 2969-2974.

Ye, F., et al., Constructing $BiVO_4$—Au@ CdS photocatalyst with energic charge-carrier-separation capacity derived from facet induction and Z-scheme bridge for degradation of organic pollutants. Applied Catalysis B: Environmental, 2018. 227: p. 258-265.

Han, H. S., et al., Boosting the solar water oxidation performance of a $BiVO_4$ photoanode by crystallographic orientation control. Energy & Environmental Science, 2018. 11(5): p. 1299-1306.

Abdi, F. F., et al., Efficient solar water splitting by enhanced charge separation in a bismuth vanadate-silicon tandem photoelectrode. Nature communications, 2013. 4(1): p. 1-7.

Parmar, K. P. S., et al., Photocatalytic and photoelectrochemical water oxidation over metal-doped monoclinic $BiVO_4$ photoanodes. ChemSusChem, 2012. 5(10): p. 1926-1934.

Yang, J.-S. and J.-J. Wu, Low-potential driven fully-depleted $BiVO_4$/ZnO heterojunction nanodendrite array photoanodes for photoelectrochemical water splitting. Nano Energy, 2017. 32: p. 232-240.

Zhou, L., et al., High light absorption and charge separation efficiency at low applied voltage from Sb-doped $SnO_2$/$BiVO_4$ core/shell nanorod-array photoanodes. Nano letters, 2016. 16(6): p. 3463-3474.

Zhang, L., L. O. Herrmann, and J. J. Baumberg, Size dependent plasmonic effect on $BiVO_4$ photoanodes for solar water splitting. Scientific reports, 2015. 5(1): p. 1-12.

Yang, W., et al., plasmonic Pd nanoparticle- and plasmonic Pd nanorod-decorated $BiVO_4$ electrodes with enhanced photoelectrochemical water splitting efficiency across visible-NIR region. Nanoscale research letters, 2016. 11(1): p. 1-8.

Wei, Y., et al., Spontaneous photoelectric field-enhancement effect prompts the low cost hierarchical growth of highly ordered heteronanostructures for solar water splitting. Nano Research, 2016. 9(6): p. 1561-1569.

Nyarige, J. S., T. P. Krüger, and M. Diale, Influence of precursor concentration and deposition temperature on the photoactivity of hematite electrodes for water splitting. Materials Today Communications, 2020. 25: p. 101459.

Baqiah, H., et al., Effects of precursor concentration on the microstructural, optical and photoelectrochemical properties of $Bi_2O_3$ films synthesized by sol-gel method. Optik, 2020. 206: p. 164303.

Zhang, S., et al., Enhanced piezoelectric-effect-assisted photoelectrochemical performance in ZnO modified with dual cocatalysts. Applied Catalysis B: Environmental, 2020. 262: p. 118279.

Masoumi, Z., M. Tayebi, and B.-K. Lee, Ultrasonication-assisted liquid-phase exfoliation enhances photoelectrochemical performance in $\alpha$-$Fe_2O_3$/$MoS_2$ photoanode. Ultrasonics sonochemistry, 2021. 72: p. 105403.

Wickman, B., et al., Iron oxide films prepared by rapid thermal processing for solar energy conversion. Scientific reports, 2017. 7(1): p. 1-9.

Patel, M., et al., Photocurrent enhancement by a rapid thermal treatment of nanodisk-shaped SnS photocathodes. The journal of physical chemistry letters, 2017. 8(24): p. 6099-6105.

Das, V. D., J. Sathyanarayanan, and L. Damodare, Effect of annealing and surface treatment on the efficiency of photoelectrochemical (PEC) solar cells with vacuum-deposited n-InSe thin film electrode. Surface and Coatings Technology, 1997. 94: p. 669-671.

Phuan, Y. W., et al., Effects of annealing temperature on the physicochemical, optical and photoelectrochemical properties of nanostructured hematite thin films prepared via electrodeposition method. Materials Research Bulletin, 2015. 69: p. 71-77.

Tan, H. L., R. Amal, and Y. H. Ng, Exploring the different roles of particle size in photoelectrochemical and photocatalytic water oxidation on $BiVO_4$. ACS applied materials & interfaces, 2016. 8(42): p. 28607-28614.

Liu, J., et al., Investigation of porosity and heterojunction effects of a mesoporous hematite electrode on photoelectrochemical water splitting. Physical Chemistry Chemical Physics, 2013. 15(24): p. 9775-9782.

Sousa, M., et al., effect of rapid thermal processing conditions on the properties of $Cu_2ZnSnS_4$ thin films and solar cell performance. Solar energy materials and solar cells, 2014. 126: p. 101-106.

Cavaleiro, A., et al., The effect of heating rate on the phase transformation of Ni/Ti multilayer thin films. Vacuum, 2017. 139: p. 23-25.

Choi, Y., M. Jung, and Y.-K. Lee, Effect of heating rate on the activation energy for crystallization of amorphous $Ge_2Sb_2Te_5$ thin film. Electrochemical and Solid State Letters, 2009. 12(7): p. F17.

Zhang, Q., S. Jiang, and Y. Li, Structural Characteristics of (Ba, Sr) $TiO_3$ Thin Films by Rapid Thermal Annealing. Surface Review and Letters, 2007. 14(01): p. 141-145.

Shen, M., et al., A concise model for evaluating water electrolysis. International Journal of Hydrogen Energy, 2011. 36(22): p. 14335-14341.

Ding, K., et al., Density functional theory study on the electronic and optical properties of three crystalline phases of $BiVO_4$. Theoretical Chemistry Accounts, 2013. 132(5): p. 1-7.

Holder, C. F. and R. E. Schaak, Tutorial on powder X-ray diffraction for characterizing nanoscale materials. 2019, ACS Publications.

Zhang, K., et al., Black phosphorene as a hole extraction layer boosting solar water splitting of oxygen evolution catalysts. Nature communications, 2019. 10(1): p. 1-10.

Luo, W., et al., Solar hydrogen generation from seawater with a modified $BiVO_4$ photoanode. Energy & Environmental Science, 2011. 4(10): p. 4046-4051.

Zhang, L., D. Chen, and X. Jiao, Monoclinic structured $BiVO_4$ nanosheets: hydrothermal preparation, formation mechanism, and coloristic and photocatalytic properties. The Journal of Physical Chemistry B, 2006. 110(6): p. 2668-2673.

Samsudin, M. F. R., et al., Tailoring the morphological structure of $BiVO_4$ photocatalyst for enhanced photoelectrochemical solar hydrogen production from natural lake water. Applied Surface Science, 2020. 504: p. 144417.

Huang, M., et al., Low-dimensional Mo: $BiVO_4$ photoanodes for enhanced photoelectrochemical activity. Journal of Materials Chemistry A, 2018. 6(8): p. 3602-3609.

Zhao, Z., et al., effect of sulfur doping on the photocatalytic performance of $BiVO_4$ under visible light illumination. Chinese Journal of Catalysis, 2013. 34(8): p. 1617-1626.

Li, F., et al., Synergistically enhanced photocatalytic reduction of $CO_2$ on N—Fe codoped $BiVO_4$ under visible light irradiation. Physical Chemistry Chemical Physics, 2017. 19(32): p. 21862-21868.

Tan, G., et al., Microwave hydrothermal synthesis of N-doped $BiVO_4$ nanoplates with exposed (040) facets and enhanced visible-light photocatalytic properties. Ceramics International, 2014. 40(7): p. 9541-9547.

Wang, M., et al., Effective visible light-active nitrogen and samarium co-doped $BiVO_4$ for the degradation of organic pollutants. Journal of Alloys and Compounds, 2015. 648: p. 1109-1115.

Zhao, Z., et al., Enhanced visible-light photocatalytic activities of porous olive-shaped sulfur-doped $BiVO_4$-supported cobalt oxides. Solid state sciences, 2013. 18: p. 98-104.

Chen, L., et al., Enhanced photocatalytic activity of hierarchically structured $BiVO_4$ oriented along {040} facets with different morphologies. Materials Letters, 2015. 147: p. 1-3.

Yu, J. and A. Kudo, Hydrothermal synthesis of nanofibrous bismuth vanadate. Chemistry letters, 2005. 34(6): p. 850-851.

Wu, J.-M., et al., Multi-layer monoclinic $BiVO_4$ with oxygen vacancies and $V^{4+}$ species for highly efficient visible-light photoelectrochemical applications. Applied Catalysis B: Environmental, 2018. 221: p. 187-195.

Hankin, A., et al., Flat band potential determination: avoiding the pitfalls. Journal of Materials Chemistry A, 2019. 7(45): p. 26162-26176.

Bicer, Y. and I. Dincer, Electrochemical impedance spectroscopic assessment and analysis of a newly developed photoelectrochemical cell. Chemical Engineering and Processing: Process Intensification, 2017. 117: p. 141-153.

Shi, X., et al., Efficient photoelectrochemical hydrogen production from bismuth vanadate-decorated tungsten trioxide helix nanostructures. Nature communications, 2014. 5(1): p. 1-8.

Kim, T. W., et al., Simultaneous enhancements in photon absorption and charge transport of bismuth vanadate photoanodes for solar water splitting. Nature communications, 2015. 6(1): p. 1-10.

Rohloff, M., et al., Mo-doped $BiVO_4$ thin films-high photoelectrochemical water splitting performance achieved by a tailored structure and morphology. Sustainable Energy & Fuels, 2017. 1(8): p. 1830-1846.

Huang, M., et al., Low-dimensional Mo: $BiVO_4$ photoanodes for enhanced photoelectrochemical activity. Journal of Materials Chemistry A, 2018. 6(8): p. 3602-3609.

Nair, V, et al., Textured nanoporous Mo: $BiVO_4$ photoanodes with high charge transport and charge transfer quantum efficiencies for oxygen evolution. Energy & Environmental Science, 2016. 9(4): p. 1412-1429.

Huang, M., et al., Large area high-performance bismuth vanadate photoanode for efficient solar water splitting. Journal of Materials Chemistry A, 2020. 8(7): p. 3845-3850.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

What is claimed is:

1. A method for fabricating a film on a substrate comprising the steps of,
    (a) providing a sol precursor, wherein the sol precursor is a viscosity enhanced solution;
    (b) providing a substrate;
    (c) depositing the sol precursor onto the substrate via a sol-gel technique comprising a single-coating step;
    (d) annealing, without first drying, the deposited sol precursor under ambient pressure at a controlled heating rate in a muffle furnace at a temperature of from about 400° C. to about 500° C., wherein the controlled heating rate is from about 30° C./min to about 70° C./min; and
    (e) cooling down the sol precursor to form the film.

2. The method according to claim 1, wherein the sol precursor comprises a metal oxide, wherein the metal oxide is selected from the group consisting essentially of bismuth vanadate, zinc oxide, and a combination thereof.

3. The method according to claim 1, wherein the substrate comprises an adhesive base, wherein the adhesive base is selected from the group consisting essentially of FTO glass, ITO glass, plain glass, and a combination thereof.

4. The method according to claim 1, wherein the single coating step is selected from the group consisting essentially of spin coating, dip coating, and a combination thereof.

5. The method according to claim 1, wherein the annealing step takes from about 0.5 hours to about 5 hours.

* * * * *